United States Patent
Woo et al.

(10) Patent No.: US 12,332,699 B2
(45) Date of Patent: Jun. 17, 2025

(54) ELECTRONIC DEVICE AND OPERATING METHOD THEREOF

(71) Applicant: SAMSUNG ELECTRONICS CO., LTD., Suwon-si (KR)

(72) Inventors: Kwangtaek Woo, Suwon-si (KR); Jaeho Choi, Suwon-si (KR); Seonghun Kim, Suwon-si (KR); Changho Lee, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 484 days.

(21) Appl. No.: 17/939,747

(22) Filed: Sep. 7, 2022

(65) Prior Publication Data

US 2023/0126232 A1    Apr. 27, 2023

Related U.S. Application Data

(63) Continuation of application No. PCT/KR2022/011856, filed on Aug. 9, 2022.

(30) Foreign Application Priority Data

Oct. 27, 2021    (KR) .................. 10-2021-0144812

(51) Int. Cl.
*G06F 1/3212*    (2019.01)
*G06F 1/16*    (2006.01)

(52) U.S. Cl.
CPC .......... *G06F 1/1677* (2013.01); *G06F 1/1641* (2013.01); *G06F 1/1652* (2013.01); *G06F 1/3212* (2013.01)

(58) Field of Classification Search
CPC .... G06F 1/1677; G06F 1/1641; G06F 1/1652; G06F 1/3212; G06F 1/16; G06F 1/1647;
(Continued)

(56) References Cited

U.S. PATENT DOCUMENTS 9,807,227 B2 * 10/2017 Ku .................... G06F 1/3293
10,013,226 B2    7/2018 Sirpal et al.
(Continued)

FOREIGN PATENT DOCUMENTS

KR    10-2011-0084768    7/2011
KR    10-2014-0054746    5/2014
(Continued)

OTHER PUBLICATIONS

Extended European Search Report dated Sep. 25, 2024 issued in European Patent Application No. 22887304.8.
(Continued)

*Primary Examiner* — Jeff Piziali
(74) *Attorney, Agent, or Firm* — Nixon & Vanderhye, P.C.

(57) ABSTRACT

An electronic device is provided. The electronic device may include: a battery, a first sensor configured to detect a folding angle of the electronic device, a flexible display, a sub-display, and a processor configured to determine whether the electronic device is in a folding mode or an unfolding mode based on a detection result from the first sensor, wherein the processor is configured to: based on a battery information provision request in the folding mode of the electronic device, calculate a first available time of the battery in the folding mode based on a power consumption in the folding mode and an available capacity of the battery and control the sub-display to display the available capacity and the first available time on the sub-display, and based on the battery information provision request in the unfolding mode of the electronic device, calculate a second available time of the battery in the unfolding mode based on a power consumption in the unfolding mode and the available capacity and control the flexible display to display the available capacity and the second available time on the flexible display.

20 Claims, 33 Drawing Sheets

(58) Field of Classification Search
CPC .......... G06F 1/3265; H02J 7/00; H04M 1/02; H04M 1/72403
See application file for complete search history.

(56) References Cited

U.S. PATENT DOCUMENTS

| | | | |
|---|---|---|---|
| 10,222,972 | B2 | 3/2019 | Kokuryu |
| 2001/0037719 | A1 | 11/2001 | Gardner et al. |
| 2014/0375702 | A1* | 12/2014 | Cho .................. G06F 3/04886 345/102 |
| 2016/0026381 | A1 | 1/2016 | Kim et al. |
| 2017/0011210 | A1* | 1/2017 | Cheong ................. A61B 5/681 |
| 2023/0280401 | A1* | 9/2023 | Woo ......................... H02J 7/00 361/679.01 |
| 2024/0231557 | A1* | 7/2024 | Kim .................... G06F 3/04886 |

FOREIGN PATENT DOCUMENTS

| | | |
|---|---|---|
| KR | 10-2015-0062350 | 6/2015 |
| KR | 10-2017-0019072 | 2/2017 |
| KR | 10-2017-0102451 | 9/2017 |
| KR | 10-2019-0141518 | 12/2019 |
| KR | 10-2020-0012105 | 2/2020 |

OTHER PUBLICATIONS

Search Report and Written Opinion dated Nov. 16, 2022 issued in International Patent Application No. PCT/KR2022/011856.

\* cited by examiner

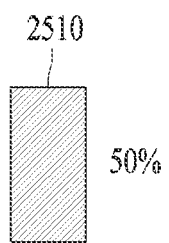 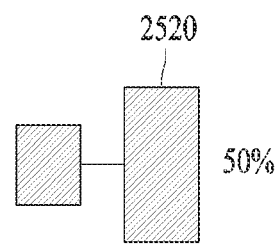
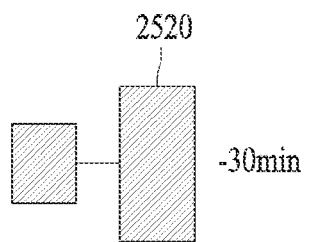 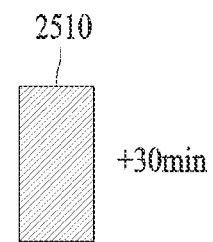
FIG. 26A    FIG. 26B

ELECTRONIC DEVICE AND OPERATING METHOD THEREOF

CROSS-REFERENCE TO RELATED APPLICATIONS

This application is a continuation of International Application No. PCT/KR2022/011856 designating the United States, filed on Aug. 9, 2022, in the Korean Intellectual Property Receiving Office and claiming priority to Korean Patent Application No. 10-2021-0144812, filed on Oct. 27, 2021, in the Korean Intellectual Property Office and to Korean Patent Application No. 10-2021-0162646, filed on Nov. 23, 2021, in the Korean Intellectual Property Office, the disclosures of all of which are incorporated by reference herein in their entireties.

BACKGROUND

1. Field

The disclosure relates to an electronic device.

2. Description of Related Art

The development of electronic technology has accelerated the development and distribution of electronic products of various types. For example, a foldable electronic device and a rollable electronic device are being developed.

Battery information (e.g., a battery charge level) is uniformly provided to a user without consideration of a change in the physical form factor of an electronic device. Even if an actual battery available time changes as the physical form factor of the electronic device changes, the user may have difficulty in recognizing or coping with battery information corresponding to the changed form factor.

SUMMARY

Embodiments of the disclosure may provide an electronic device for providing a user with battery information corresponding to a changed form factor when the form factor changes.

According to various example embodiments, an electronic device includes: a battery; a first sensor configured to detect a folding angle of the electronic device; a flexible display; a sub-display; and a processor configured to determine whether the electronic device is in a folding mode or an unfolding mode based on a detection result from the first sensor, wherein the processor is configured to: based on a battery information provision request in the folding mode of the electronic device, calculate a first available time of the battery in the folding mode based on a power consumption in the folding mode and an available capacity of the battery and display the available capacity and the first available time on the sub-display, and based on the battery information provision request in the unfolding mode of the electronic device, calculate a second available time of the battery in the unfolding mode based on a power consumption in the unfolding mode and the available capacity and display the available capacity and the second available time on the flexible display.

According to various example embodiments, an electronic device includes: a battery; a flexible display; and a processor configured to, based on a battery information provision request in a first mode in which the flexible display is reduced, calculate a fourth available time of the battery in the first mode based on a power consumption in the first mode and an available capacity of the battery and display the available capacity and the fourth available time on the flexible display, and based on the battery information provision request in a second mode in which the flexible display is expanded, calculate a fifth available time of the battery in the second mode based on a power consumption in the second mode and the available capacity and display the available capacity and the fifth available time on the flexible display.

According to various example embodiments, an electronic device includes: a battery; a display; a connector electrically connected to a detachable module; and a processor configured to, based on a battery information provision request in a detaching mode in which the module is detached from the electronic device, calculate a seventh available time of the battery in the detaching mode based on a power consumption in the detaching mode and an available capacity of the battery and display the available capacity and the seventh available time on the display, and based on the battery information provision request in an attaching mode in which the module is attached to the electronic device through the connector, calculate an eighth available time of the battery in the attaching mode based on a power consumption in the attaching mode and the available capacity and display the available capacity and the eighth available time on the display.

According to various example embodiments, a method of operating an electronic device includes: determining whether the electronic device is in a folding mode, an unfolding mode, or a custom mode in which the electronic device is bent, using a first sensor; based on a battery information provision request in the folding mode, calculating a first available time of the battery in the folding mode based on a power consumption in the folding mode and an available capacity of the battery; displaying the available capacity and the first available time on a sub-display of the electronic device; based on the battery information provision request in the unfolding mode, calculating a second available time of the battery in the unfolding mode based on a power consumption in the unfolding mode and the available capacity; displaying the available capacity and the second available time on a flexible display of the electronic device; based on the battery information provision request in the custom mode, calculating a third available time of the battery in the custom mode based on a power consumption in the custom mode and the available capacity; and displaying the available capacity and the third available time on the flexible display.

According to various example embodiments, it is possible to provide a user with battery information corresponding to a changed form factor when the form factor of an electronic device changes, thereby preventing and/or reducing problem situations (e.g., camera malfunction, call malfunction) caused when the electronic device is turned off during operation or fails to predict an available time.

According to various example embodiments, it is possible to provide a user with an accurate available time according to a change in the form factor of an electronic device, thereby improving the usability of the electronic device.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 24, 25, 26A and 26B are diagrams illustrating another example of an electronic device according to various embodiments.

DETAILED DESCRIPTION

Figure 1:
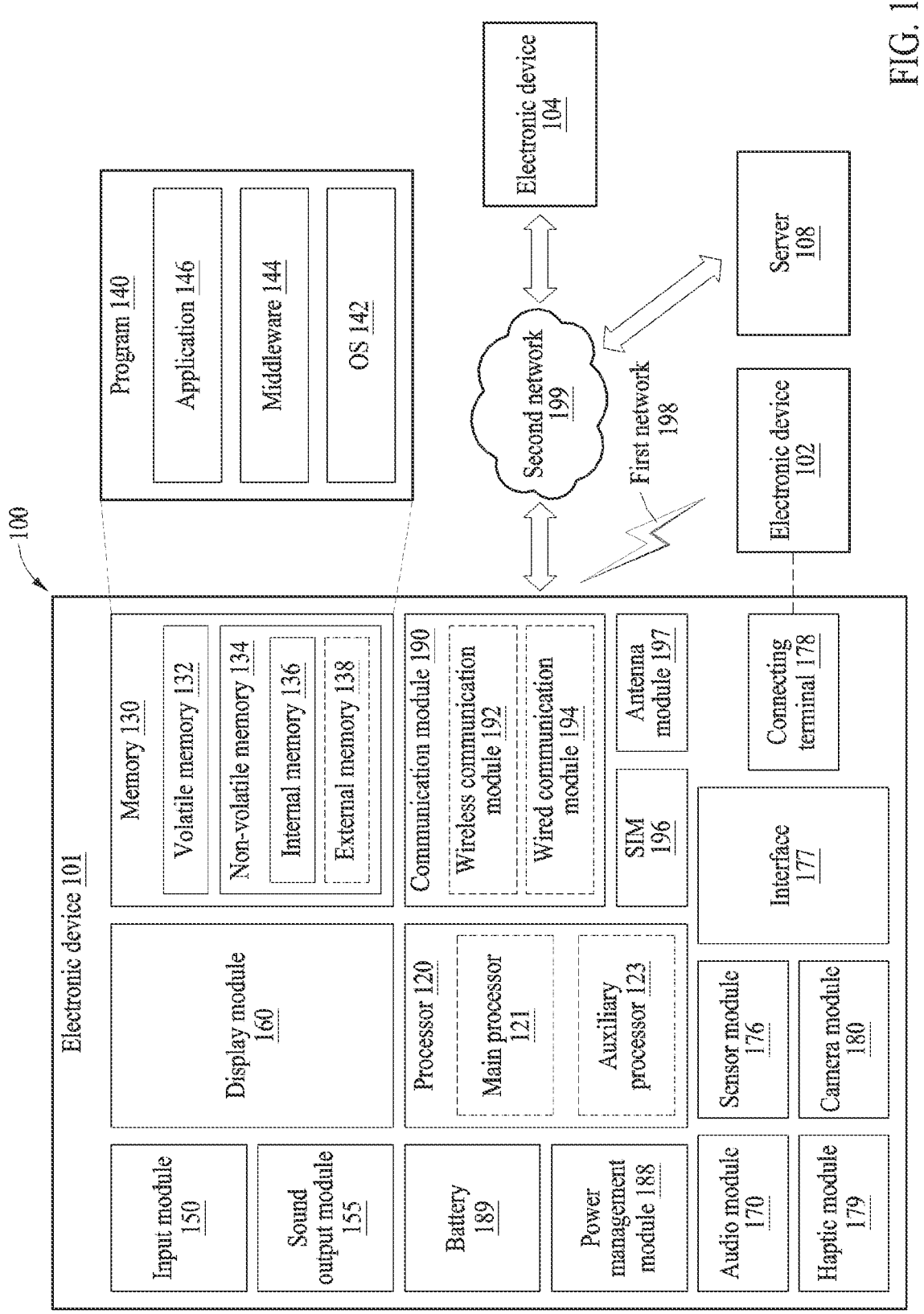
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a portion of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that operate independently of the processor 120 (e.g., an application processor) and support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
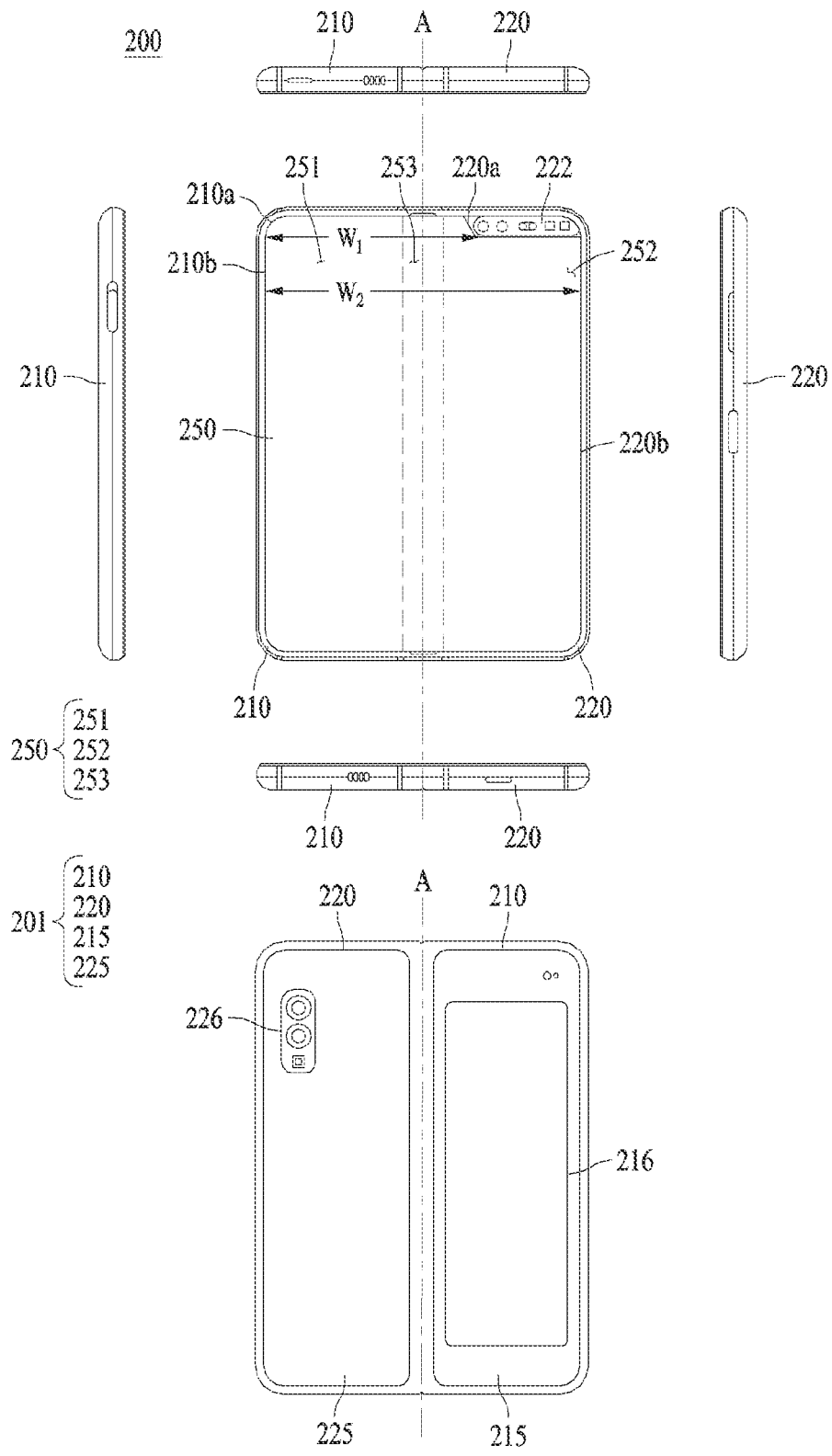
FIG. 2 is a diagram illustrating a foldable electronic device in an unfolded state according to various embodiments.
Figure 3:
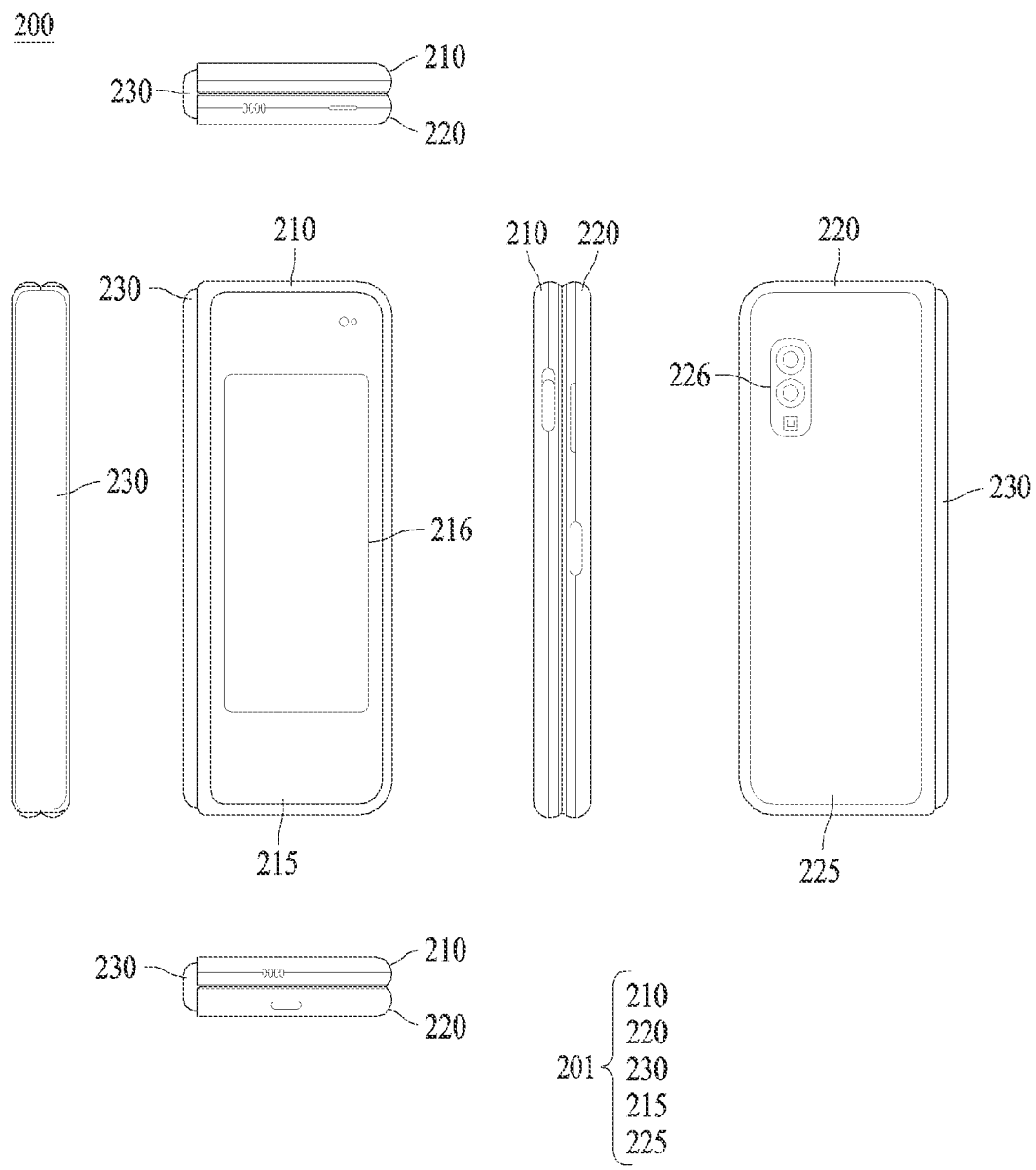
FIG. 3 is a diagram illustrating a foldable electronic device in a folded state according to various embodiments.
Figure 4A:
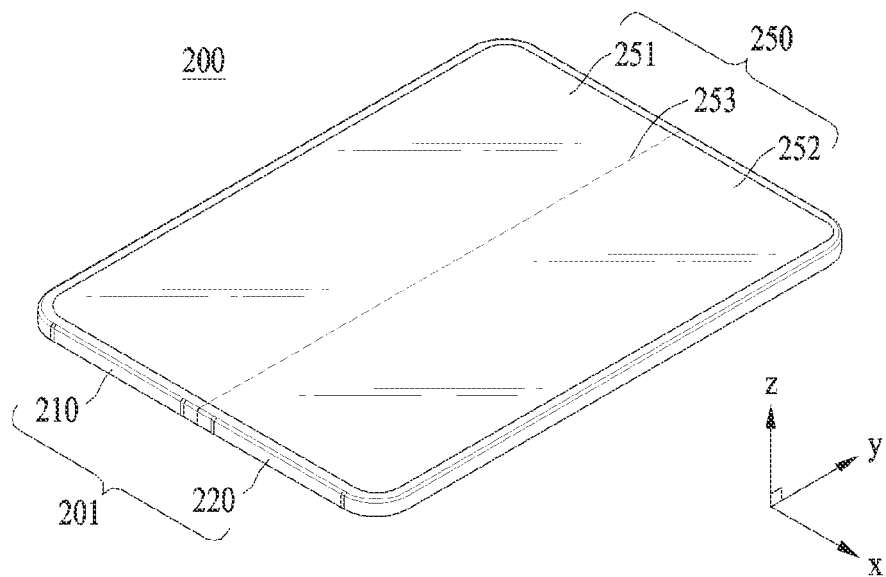
FIGS. 4A and 4B are perspective views of a foldable electronic device in a fully unfolded state or a partially unfolded state (or an intermediate state) according to various embodiments.
Figure 4B:
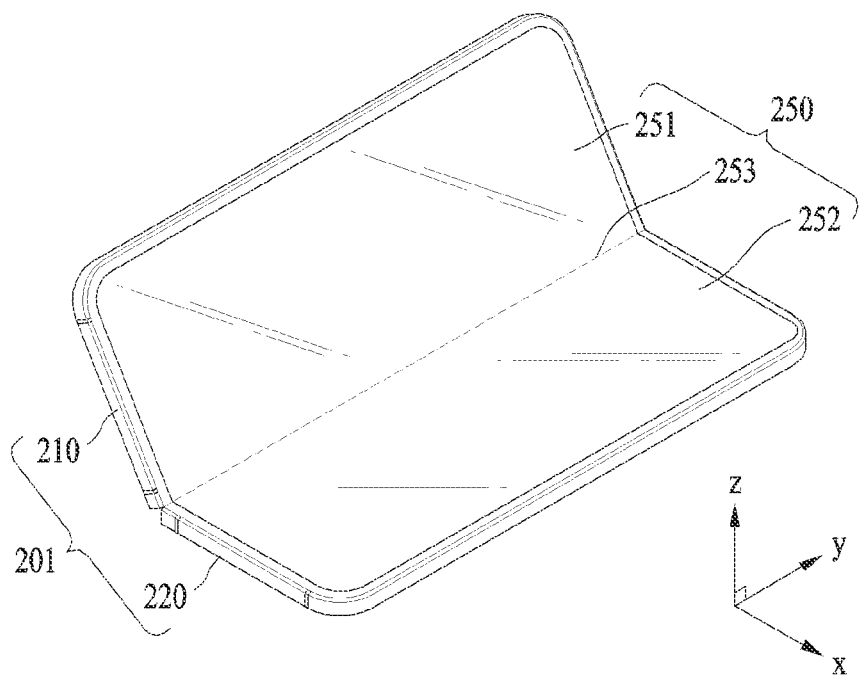

FIG. 2 is a diagram illustrating a foldable electronic device 200 in an unfolded state according to various embodiments. FIG. 3 is a diagram illustrating the foldable electronic device 200 in a folded state according to various embodiments. FIGS. 4A and 4B are perspective views illustrating an example of a fully unfolded state and a partially unfolded state (or an intermediate state) of the foldable electronic device 200 according to various embodiments.

The electronic device 200 of FIGS. 2, 3, 4A and 4B (which may be referred to as FIGS. 2 through 4B) is an example of the electronic device 101 of FIG. 1, and may be a foldable or bendable electronic device.

In FIGS. 4A and 4B and other following drawings, illustrated is a spatial coordinate system defined by an X axis, a Y axis, and a Z axis that are orthogonal to each other. Here, the X-axis may represent a width direction of an electronic device, the Y-axis may represent a length direction of the electronic device, and the Z-axis may represent a height (or thickness) direction of the electronic device. In the following description, a first direction may indicate a direction parallel to the Z axis.

Referring to FIGS. 2 and 3, in an example embodiment, the electronic device 200 may include a foldable housing 201, and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from an outside of the electronic device 200) may be defined as a front surface of the electronic device 200. In addition, a surface opposite to the front surface may be defined as a rear surface of the electronic device 200. Further, a surface surrounding a space between the front surface and the rear surface may be defined as a side surface of the electronic device 200.

According to various example embodiments, the foldable housing 201 may include a first housing structure 210, a second housing structure 220 including a sensor area 222, a first rear cover 215, a second rear surface 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2 and 3, and may be implemented in a different shape or a different combination of components. For example, in an example embodiment, the first housing structure 210 and the first rear cover 215 may be integrally formed, and the second housing structure 220 and the second rear cover 225 may be integrally formed.

According to various example embodiments, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to an example embodiment, the first surface may face the third surface in a state in which the electronic device 200 is fully folded, and the third direction may be identical to the first direction in a state in which the electronic device 200 is fully unfolded.

According to various example embodiments, the first housing structure 210 and the second housing structure 220 are disposed on both sides with respect to a folding axis A and generally may be symmetrical with respect to the folding axis A. As to be described hereinafter, an angle or distance between the first housing structure 210 and the second housing structure 220 may vary according to whether the state of the electronic device 200 is the unfolded state, the folded state, or a partially unfolded or folded state (or an intermediate state). According to an example embodiment, unlike the first housing structure 210, the second housing structure 220 may additionally include the sensor area 222, in which various sensors are arranged, however, the first housing structure 210 and the second housing structure 220 may have shapes symmetrical to each other in areas other than the sensor area 222.

According to various example embodiments, as shown in FIG. 2, the first housing structure 210 and the second housing structure 220 may together form a recess for accommodating the display 250. In an example embodiment, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be longer than the first width w1. In an example embodiment, the first portion 220a and the second portion 220b of the second housing structure 220 may be at different distances from the folding axis A. The widths of the recess are not limited to the shown example. In an example embodiment, the recess may have a plurality of widths due to the shape of the sensor area 222 or asymmetrical portions of the first housing structure 210 and the second housing structure 220.

According to various example embodiments, the sensor area 222 may be formed to have a predetermined area adjacent to one corner of the second housing structure 220. However, the arrangement, shape, and size of the sensor area 222 are not limited to the shown example. For example, in an example embodiment, the sensor area 222 may be provided at another corner of the second housing structure 220 or in a predetermined area between an upper corner and a lower corner. In an example embodiment, components embedded in the electronic device 200 to perform various functions may be exposed to the front surface of the electronic device 200 through the sensor area 222 or through one or more openings provided in the sensor area 222. In various example embodiments, the components may include various types of sensors. The sensors may include, for example, at least one of a front camera, a receiver, or a proximity sensor. According to various example embodiments, the sensor region 222 may not be included in the second housing structure 220 or may be formed at a position different from that shown in the drawings.

According to various example embodiments, at least a portion of the first housing structure 210 and the second housing structure 220 may be formed of a metal material or a non-metal material having a selected magnitude of rigidity to support the display 250. At least a portion formed of the metal material may provide a ground plane for the electronic device 200, and may be electrically connected to a ground line formed on a printed circuit board (PCB) disposed inside the foldable housing 201.

According to various example embodiments, the first rear cover 215 may be disposed on one side of the folding axis A on a rear surface of the electronic device 200, and may have, for example, a substantially rectangular periphery that may be surrounded by the first housing structure 210. Similarly, the second rear cover 225 may be disposed on the other side of the folding axis A on the rear surface of the electronic device 200, and may have a periphery that may be surrounded by the second housing structure 220.

According to various example embodiments, the first rear cover 215 and the second rear cover 225 may be substantially symmetrical with respect to the folding axis A. However, the first rear cover 215 and the second rear cover 225 are not necessarily mutually symmetrical, and in another example embodiment, the electronic device 200 may include a first rear cover 215 and a second rear cover 225 in various shapes. In an example embodiment, the first rear cover 215 may be formed integrally with the first housing structure 210, and the second rear cover 225 may be formed integrally with the second housing structure 220.

According to various example embodiments, the first rear cover 215, the second rear cover 225, the first housing structure 210, and the second housing structure 220 may form a space in which various components (e.g., a PCB, or a battery) of the electronic device 200 are to be disposed. In an example embodiment, one or more components may be disposed or visually exposed on the rear surface of the electronic device 200. For example, at least a portion of a sub-display may be visually exposed through a first rear area 216 of the first rear cover 215. In another example embodiment, one or more components or sensors may be visually exposed through a second rear area 226 of the second rear cover 225. In various example embodiments, the sensors may include a proximity sensor and/or a rear camera.

According to various example embodiments, a front camera exposed to the front surface of the electronic device 200 through one or more openings provided in the sensor area 222, or a rear camera exposed through the second rear area 226 of the second rear cover 225 may include one or more lenses, an image sensor, and/or an image signal processor. A flash may include, for example, a light emitting diode (LED) or a xenon lamp. In some example embodiments, two or more lenses (e.g., infrared camera, wide-angle, and telephoto lenses) and image sensors may be disposed on one surface of the electronic device 200.

Referring to FIG. 3, the hinge cover may be disposed between the first housing structure 210 and the second housing structure 220 to cover internal components (e.g., the hinge structure 230). According to an example embodiment, the hinge structure 230 may be covered by a portion of the first housing structure 310 and a portion of the second housing structure 320, or may be exposed to the outside, depending on the state of the electronic device 200 (e.g., the unfolded state, the intermediate state, or the folded state.

For example, when the electronic device 200 is in the unfolded state (e.g., the fully unfolded state) as illustrated in FIG. 2, the hinge structure 230 may be covered by the first housing structure 210 and the second housing structure 220 not to be exposed. For another example, when the electronic device 200 is in the folded state (e.g., the fully folded state) as illustrated in FIG. 3, the hinge structure 230 may be exposed to the outside, being between the first housing structure 210 and the second housing structure 220. For still another example, when the electronic device 200 is in the intermediate state with an angle formed between the first housing structure 210 and the second housing structure 220, the hinge structure 230 may be partially exposed to the outside, being between the first housing structure 210 and the second housing structure 220. In this example, an exposed area may be smaller than an area exposed in the fully folded state. In an example embodiment, the hinge structure 230 may include a curved surface.

According to various example embodiments, the display 250 may be disposed in a space formed by the foldable housing 201. For example, the display 250 may be seated on the recess formed by the foldable housing 201 and may be viewed from the outside through the front surface of the electronic device 200. For example, the display 250 may include most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to various example embodiments, the display 250 may refer to a display in which at least one area is deformable into a planar surface or a curved surface. In an example embodiment, the display 250 may include a folding area 253, a first area 251 disposed on one side of the folding area 253 (e.g., on the left side of the folding area 253 shown in FIG. 2), and a second area 252 disposed on the other side of the folding area 253 (e.g., on the right side of the folding area 253 shown in FIG. 2).

However, such an area division of the display 250 as illustrated in FIG. 2 is provided merely as an example, and the display 250 may be divided into a plurality of areas (e.g., two areas or four or more areas) according to a structure or functions thereof. In an example, as shown in FIG. 2, the display 250 may be divided into areas based on the folding area 203 extending in parallel to the folding axis A. In another example, the display 250 may be divided into areas based on another folding axis (e.g., a folding axis parallel to a width direction of an electronic device).

According to various example embodiments, the display 250 may be coupled to or disposed adjacent to a touch panel in which a touch sensing circuit and a pressure sensor configured to measure an intensity (or pressure) of a touch are provided. For example, the display 250 is an example of a touch panel, and may be coupled to or disposed adjacent to a touch panel for detecting an electromagnetic resonance (EMR) type stylus pen.

According to various example embodiments, the first area 251 and the second area 252 may generally have symmetrical shapes with respect to the folding area 253. However, unlike the first area 251, the second area 252 may include a notch cut according to the presence of the sensor area 222, but may be symmetrical to the first area 251 in the other areas. In other words, the first area 251 and the second area 252 may include mutually symmetrical portions and mutually asymmetrical portions.

According to various example embodiments, an edge thickness of each of the first area 251 and the second area 252 may be different from an edge thickness of the folding area 253. The edge thickness of the folding area 253 may be less than those of the first area 251 and the second area 252. For example, the first area 251 and the second area 252 may be asymmetrical in terms of thickness when cross-sectionally viewed. For example, an edge of the first area 251 may be formed to have a first radius of curvature, and an edge of the second area 252 may be formed to have a second radius of curvature different from the first radius of curvature. For another example, the first area 251 and the second area 252 may be symmetrical in terms of thickness when cross-sectionally viewed. It will be described later in detail through the example embodiments disclosed in FIG. 10A and other following drawings.

Hereinafter, each area of the display 250, and operations of the first housing structure 210 and the second housing structure 220 depending on the state (e.g., a folded state, the unfolded state, or the intermediate state) of the electronic device 200) will be described.

According to various example embodiments, when the electronic device 200 is in the unfolded state (e.g., FIG. 2), the first housing structure 210 and the second housing structure 220 may be arranged to face the same direction while forming an angle of 180 degrees. The surface of the first area 251 of the display 250 and the surface of the second area 252 thereof may face the same direction (e.g., a front direction of an electronic device) while forming an angle of 180 degrees. The folding area 253 may form the same plane together with the first area 251 and the second area 252.

According to various example embodiments, when the electronic device 200 is in the folded state (e.g., FIG. 2), the first housing structure 210 and the second housing structure 220 may be arranged to face each other. The surface of the first area 251 and the surface of the second area 252 of the display 250 may face each other while forming a narrow angle (e.g., an angle between 0 degrees to 10 degrees). At least a portion of the folding area 253 may form a curved surface having a predetermined curvature.

According to various example embodiments, when the electronic device 200 is in the intermediate state, the first housing structure 210 and the second housing structure 220 may be arranged to form a certain angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be smaller than that in the folded state.

FIG. 4A illustrates a fully unfolded state of the electronic device 200, and FIG. 4B illustrates a partially folded stat (or an intermediate state) of the electronic device 200. As described above, the state of the electronic device 200 may be changed to the folded state or the unfolded state. According to an example embodiment, when viewed in a direction of a folding axis (e.g., the folding axis A of FIG. 2), the electronic device 200 may be folded in two types, e.g., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2 and another axis parallel to the folding axis A). In this example, the electronic device 200 may also be folded in a "multi-folding" type in which the in-folding type and the out-folding type are combined.

The in-folding type may refer to a state in which the display 250 is not exposed to the outside in the fully folded state. The out-folding type may refer to a state in which the display 250 is exposed to the outside in the fully folded state. FIG. 4B shows an intermediate state in which the electronic device 200 is partially unfolded in an in-folding process.

Although the state in which the electronic device 200 is folded in the in-folding type will be described below for convenience's sake, it should be noted that the description may be similarly applied in the state in which the electronic device 200 is folded in the out-folding type.

Figure 5A:
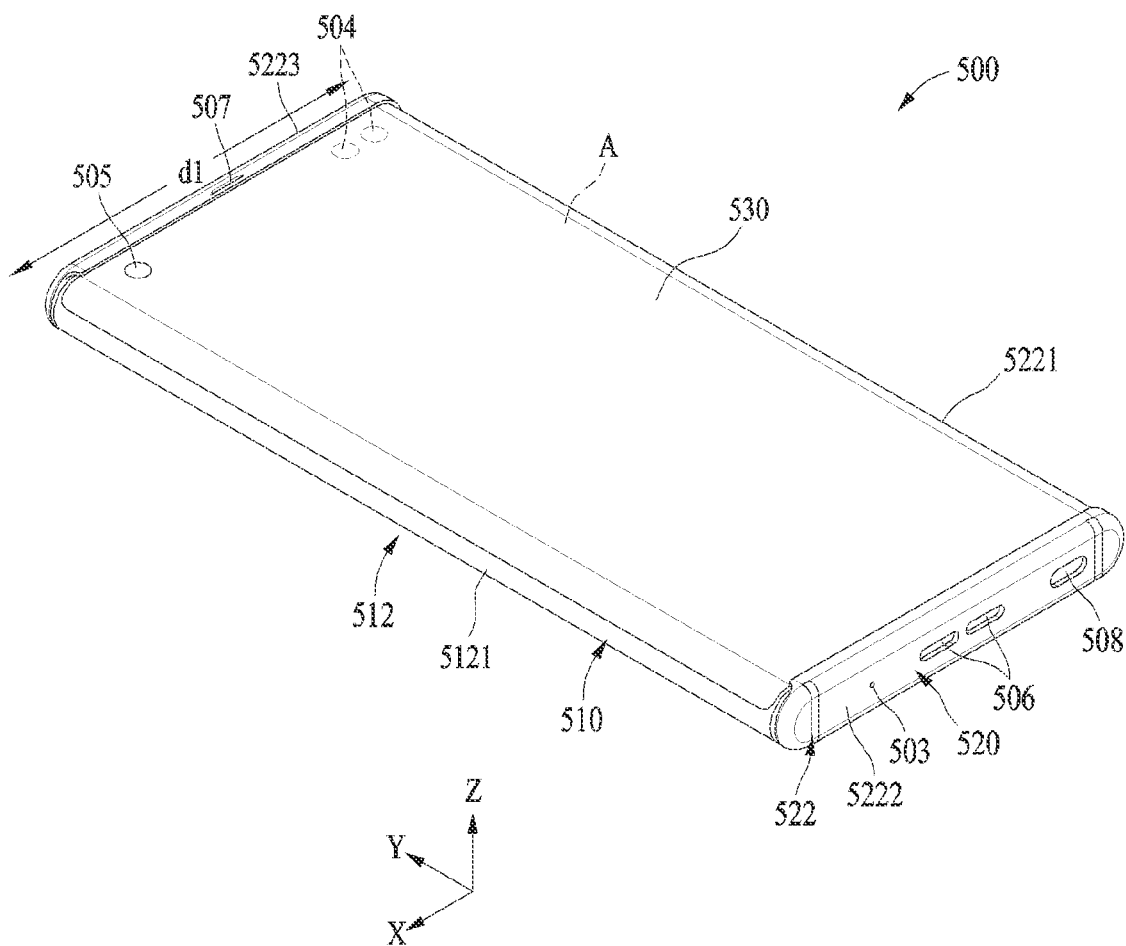
FIGS. 5A and 5B are front perspective views of an expandable electronic device in a closed state and an open state according to various embodiments.
Figure 5B:
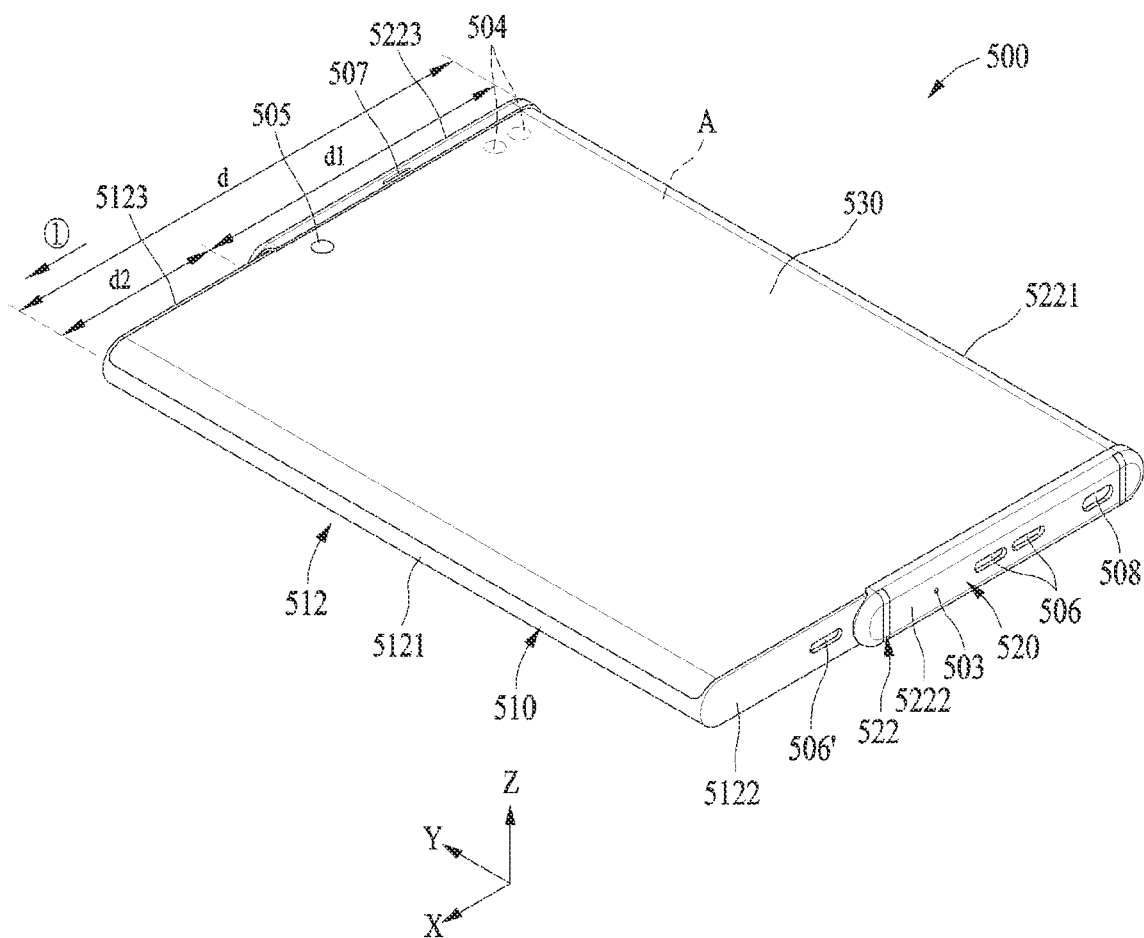
Figure 6A:
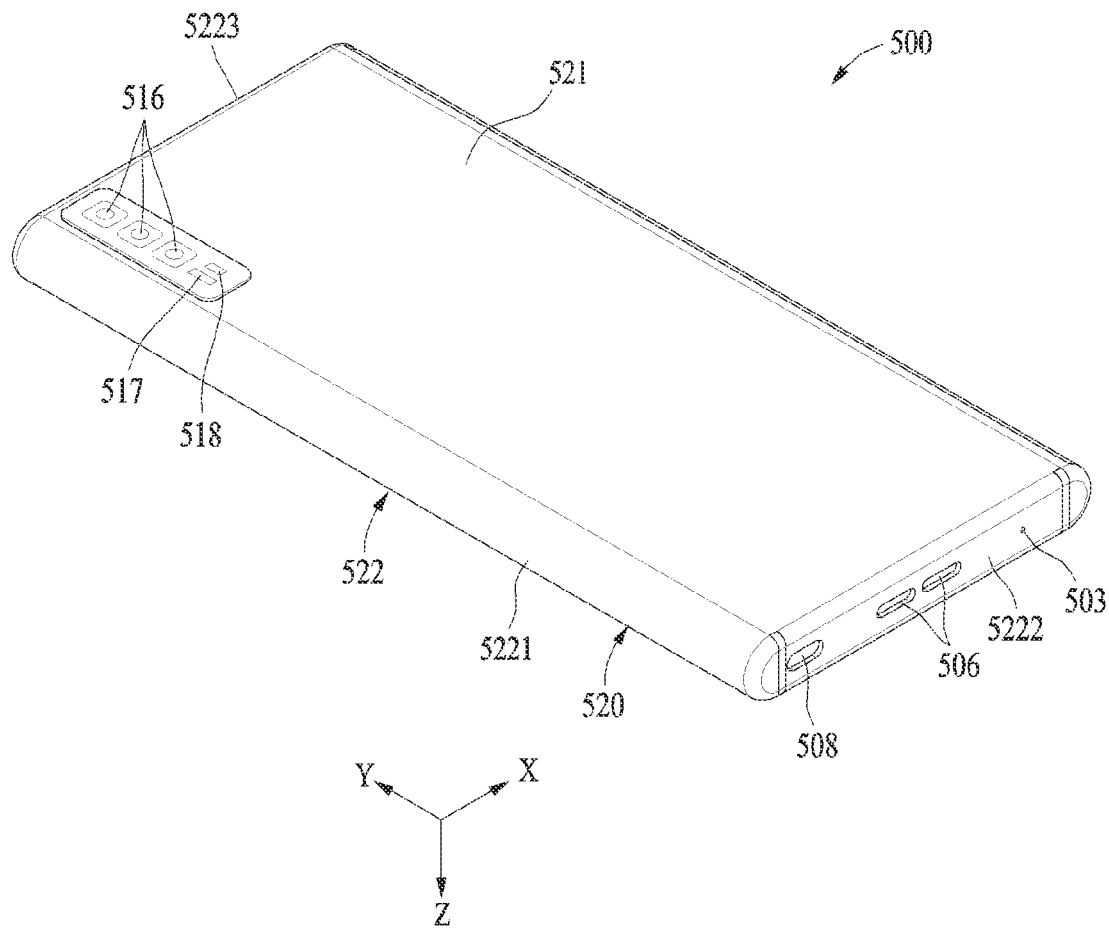
FIGS. 6A and 6B are rear perspective views of an expandable electronic device in a closed state and an open state according to various embodiments.
Figure 6B:
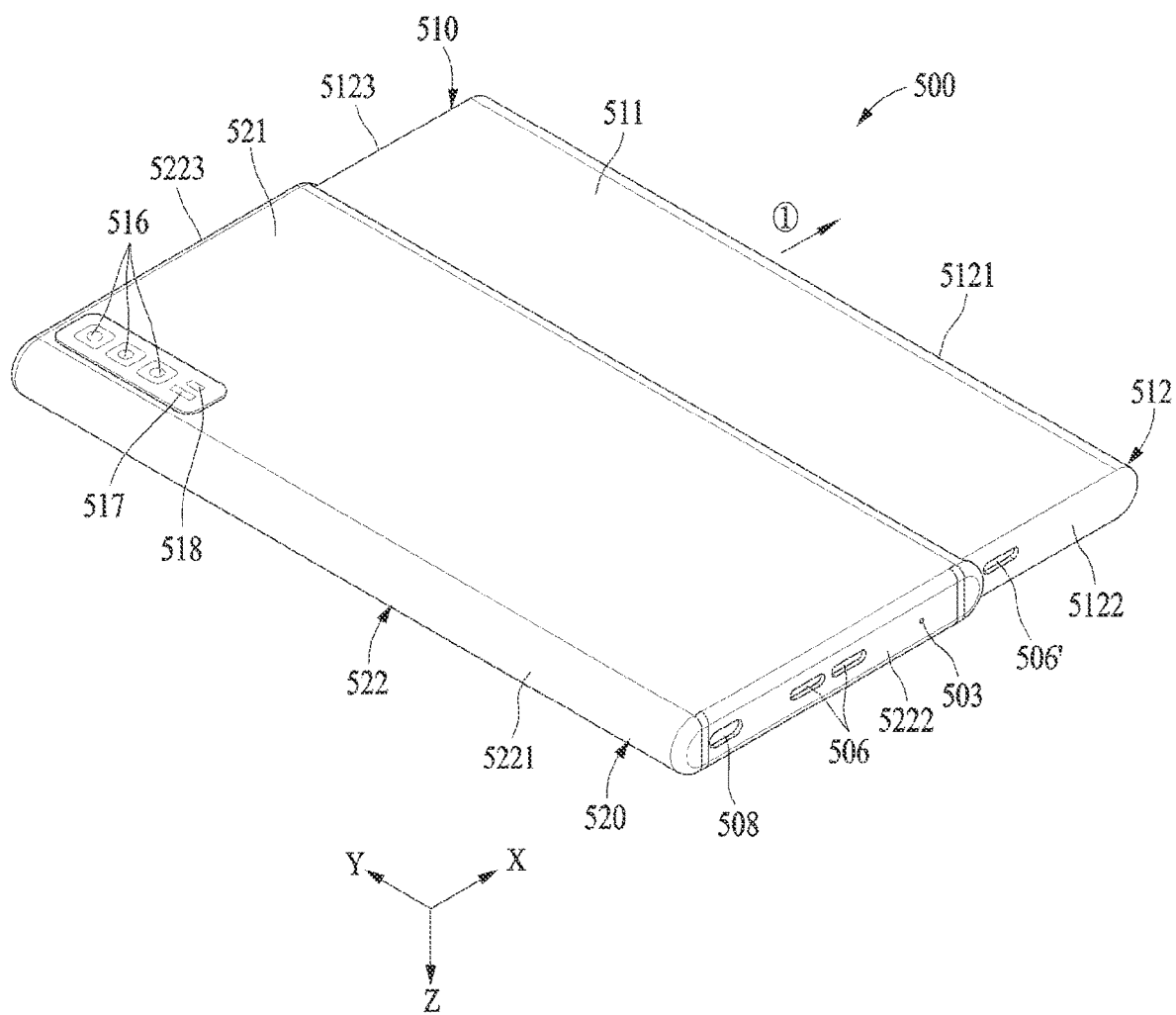

FIGS. 5A and 5B are front perspective views of an expandable or rollable electronic device 500 in a closed state and an open state according to various embodiments. FIGS. 6A and 6B are rear perspective views of the electronic device 500 in a closed state and an open state according to various embodiments.

The electronic device 500 of FIG. 5A may be at least partially similar to the electronic device 101 of FIG. 1, or may further include other examples of the electronic device.

Referring to FIGS. 5A, 5B, 6A and 6B (which may be referred to as FIGS. 5A to 6B), the electronic device 500 may include a first housing 510, and a second housing 520 that is at least partially movably coupled to the first housing 510. According to an example embodiment, the first housing 510 may include a first plate 511, and a first side frame 512 that extends in a substantially vertical direction (e.g., a z-axis direction) along an edge of the first plate 511. According to an example embodiment, the first side frame 512 may include a first side surface 5121, a second side surface 5122 extending from one end of the first side surface 5121, and a third side surface 5123 extending from the other end of the first side surface 5121. According to an example embodiment, the first housing 510 may include a first space that is at least partially closed from the outside through the first plate 511 and the first side frame 512.

According to various example embodiments, the second housing 520 may include a second plate 521, and a second side frame 522 that extends in a substantially vertical direction (e.g., the z-axis direction) along an edge of the second plate 521. According to an example embodiment, the second side frame 522 may include a fourth side surface 5221 facing away from the first side surface 5121, a fifth side surface 5222 extending from one end of the fourth side surface 5221 and at least partially coupled to the second side surface 5122, and a sixth side surface 5223 extending from the other end of the fourth side surface 5221 and at least partially coupled to the third side surface 5123. As another example embodiment, the fourth side surface 5221 may extend from a structure other than the second plate 521 and may also be coupled to the second plate 521. According to an example embodiment, the second housing 520 may include a second space that is at least partially closed from the outside through the second plate 521 and the second side frame 522. According to an example embodiment, the first plate 511 and the second plate 521 may be disposed to at least partially form a rear surface of the electronic device 500. For example, the first plate 511, the second plate 521, the first side frame 512, and the second side frame 522 may be formed of, for example, a polymer, coated or colored glass, ceramic, metal (e.g., aluminum, stainless steel (STS), or magnesium), or a combination of two or more of the above materials.

According to various example embodiments, the electronic device 500 may include a flexible display 530 disposed to be supported by the first housing 510 and the second housing 520. According to an example embodiment, the flexible display 530 may include a flat portion supported by the second housing 520, and a bendable portion extending from the flat portion and supported by the first housing 510. According to an example embodiment, the bendable portion of the flexible display 530 may be disposed in the first space of the first housing 510 not to be exposed to the outside when the electronic device 500 is closed, and may be exposed to the outside to extend from the flat portion while being supported by the first housing 510 when the electronic device 500 is open. Accordingly, the electronic device 500 may be a rollable electronic device in which a display screen of the flexible display 530 is expanded in response to an open operation according to a movement of the first housing 510 from the second housing 520.

According to various example embodiments, in the electronic device 500, the first housing 510 may be at least partially inserted into the second space of the second housing 520, and may be coupled to be movable in direction ①. For example, in the closed state, the electronic device 500 may be maintained in a state in which the first housing 510 and the second housing 520 are coupled such that a distance between the first side surface 5121 and the fourth side surface 5221 is a first distance d1. According to an example embodiment, in the open state, the electronic device 500 may be maintained in a state in which the first housing 510 is protruding from the second housing 520 to have a second interval distance d in which the first side surface 5121 is protruding from the fourth side surface 5221 by a predetermined distance d2. According to an example embodiment, the flexible display 530 may be supported by the first housing 510 and/or the second housing 520 such that both ends thereof have curved edges, in the open state.

According to various example embodiments, the electronic device 500 may automatically transition between the open state and the closed state by a driving unit disposed in the first space and/or the second space. For example, a processor (e.g., the processor 120 of FIG. 1) of the electronic device 500 may be configured to control an operation of the first housing 510 using the driving unit when an event for a transition between the open state and the closed state of the electronic device 500 is detected. In another example, the first housing 510 may manually protrude from the second housing 520 through a user's manipulation. In this case, the first housing 510 may protrude by a desired protrusion amount by the user, and thus, a screen of the flexible display 530 may vary to have various display areas. Accordingly, the processor (e.g., the processor 120 of FIG. 1) of the electronic device 500 may display an object in various ways corresponding to a display area corresponding to a predetermined protrusion amount of the first housing 510, and may control to execute an application program.

According to various example embodiments, the electronic device 500 may include at least one of an input device 503, sound output devices 506 and 507, sensor modules 504 and 517, camera modules 505 and 516, a connector port 508, a key input device (not shown), or an indicator (not shown). In another example embodiment, at least one of the above-described components of the electronic device 500 may be omitted, or the electronic device 500 may further include other components.

According to various example embodiments, the input device 503 may include a microphone 503. In some example embodiments, the input device 503 may include a plurality of microphones 503 arranged to sense a direction of sound. The sound output devices 506 and 507 may include speakers 506 and 507. The speakers 506 and 507 may include an external speaker 506 and a phone call receiver 507. In an example embodiment, when an external speaker 506' is disposed in the first housing 510, sound may be output through a speaker hole 506 formed in the second housing 520 in the closed state. According to an example embodiment, the microphone 503 or the connector port 508 may also be formed to have substantially the same configuration. In an example embodiment, the sound output devices 506 and 507 may include a speaker (e.g., a piezo speaker) that operates without a separate speaker hole 506.

According to various example embodiments, the sensor modules 504 and 517 may generate an electrical signal or a data value corresponding to an internal operational state of the electronic device 500 or an external environmental state. The sensor modules 504 and 517 may include, for example, a first sensor module 504 (e.g., a proximity sensor or an illuminance sensor) disposed on a front surface of the second housing 520, and/or a second sensor module 517 (e.g., a heart rate monitoring (HRM) sensor) disposed on a rear surface of the second housing 520. According to an example embodiment, the first sensor module 504 may be disposed below the flexible display 530 in the second housing 520. According to an example embodiment, the first sensor module 504 may further include at least one of a proximity sensor, the illuminance sensor 504, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various example embodiments, the camera devices 505 and 516 may include a first camera device 505 disposed on the front surface of the second housing 520 of the electronic device 500, and a second camera 516 disposed on the rear surface of the second housing 520. According to an example embodiment, the electronic device 500 may include a flash 518 located near the second camera device 516. According to an example embodiment, the camera devices 505 and 516 may include one or more lenses, an image sensor, and/or an ISP. According to an example embodiment, the first camera device 505 may be disposed under the flexible display 530, and may be configured to capture an object through a portion of an active area of the flexible display 530. According to an example embodiment, the flash 518 may include, for example, a light-emitting diode (LED) or a xenon lamp. In some example embodiments, two or more lenses (e.g., a wide-angle lens and a telephoto lens) and image sensors may be disposed on one surface of the electronic device 500.

According to various example embodiments, the electronic device 500 may include at least one antenna (not shown). According to an example embodiment, the at least one antenna may wirelessly communicate with an external electronic device (e.g., the electronic device 104 of FIG. 1), or may wirelessly transmit and receive power required for charging. According to an example embodiment, the antenna may include a legacy antenna, a mmWave antenna, a near field communication (NFC) antenna, a wireless charging antenna, and/or a magnetic secure transmission (MST) antenna. In an example embodiment, an antenna structure may be formed through at least a portion of the first side frame 512 and/or the second side frame 522, which are formed of metal.

The electronic device according to various example embodiments may be one of various types of electronic devices. The electronic device may include, for example, a portable communication device (e.g., a smart phone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one or two of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 7:
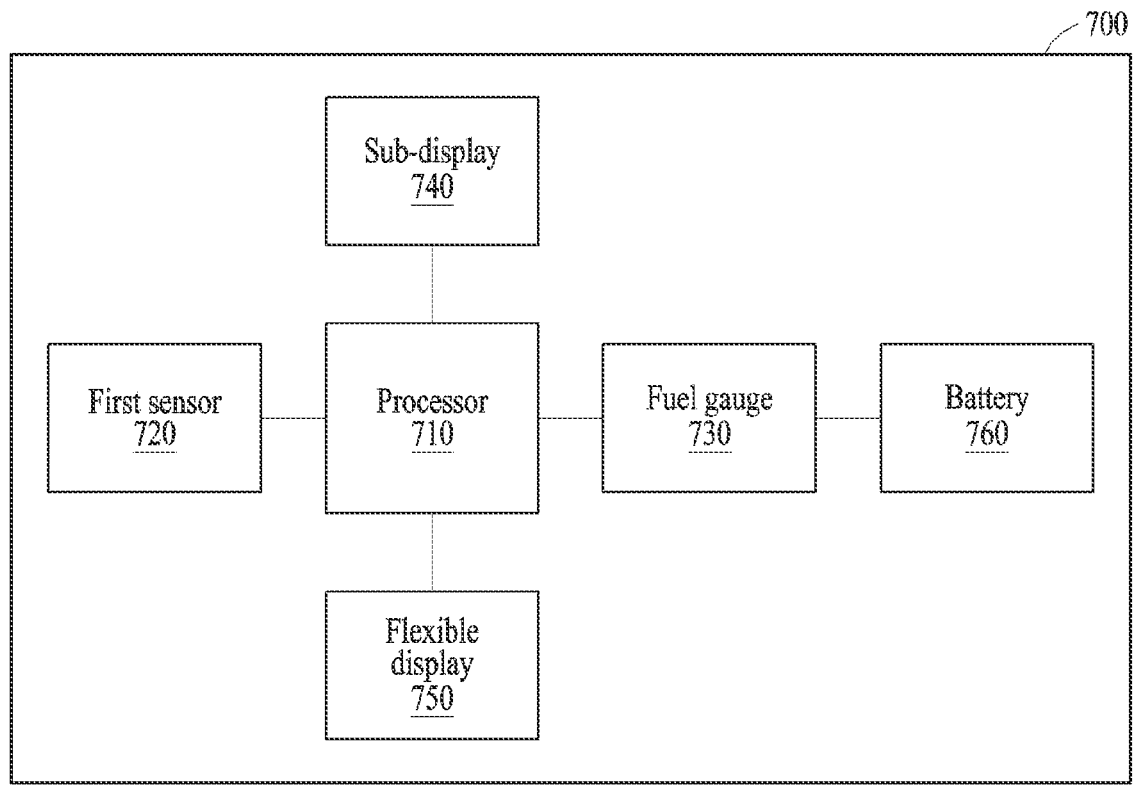
FIG. 7 is a block diagram illustrating an example configuration of an electronic device according to various embodiments.

FIG. 7 is a block diagram illustrating an example configuration of an electronic device according to various embodiments.

An electronic device 700 of FIG. 7 is an example of the electronic device 101 of FIG. 1 or the electronic device 200 of FIGS. 2 to 4B, and may be a foldable electronic device.

According to various example embodiments, the electronic device 700 may include a processor (e.g., including processing circuitry) 710 (e.g., the processor 120 of FIG. 1), a first sensor 720, a fuel gauge 730, and a sub-display 740 (e.g., the sub-display exposed through the first rear area 216 of FIG. 2), a flexible display 750 (e.g., the display 250 of FIG. 2), and a battery 760 (e.g., the battery 189 of FIG. 1).

At least one of the components of the electronic device 700 may be the same as or similar to at least one of the components of the electronic device 101 of FIG. 1, the electronic device 200 of FIGS. 2 to 4B, or the electronic device 500 of FIGS. 5A to 6B, and thus a repeated description thereof may not be provided.

According to various example embodiments, the first sensor 720 may be included in the sensor module 176 of FIG. 1.

According to various example embodiments, the sub-display 740 and the flexible display 750 may be included in the display module 160 of FIG. 1.

According to various example embodiments, the first sensor 720 may detect a folding angle of the electronic device 700 (or the flexible display 750).

According to various example embodiments, the first sensor 720 may include a Hall sensor. The Hall sensor may generate an electrical signal (e.g., a voltage) in response to a magnetic field. The Hall sensor may generate an electrical signal of a relatively high intensity when the magnetic field is strong, and generate an electrical signal of a relatively low intensity when the magnetic field is weak. In an example embodiment, the Hall sensor may be positioned in a first housing (e.g., the first housing structure 210 of FIG. 2) of a foldable housing (e.g., the foldable housing 201 of FIG. 2) of the electronic device 700, and an element (e.g., a magnetic body) that generates a magnetic field may be positioned in a second housing (e.g., the second housing structure 220 of FIG. 2) of the foldable housing of the electronic device 700. In another example embodiment, the Hall sensor may be positioned in the second housing, and the magnetic body may be positioned in the first housing. When the electronic device 700 changes from an unfolding mode to a folding mode, the Hall sensor may come close to the magnetic body and detect the folding angle of the electronic device 700 through an intensity of an electrical signal generated in response to a magnetic field of the magnetic body. The folding mode may indicate the folded state of the electronic device 200 of FIGS. 2 to 4B, and the unfolding mode may indicate the fully unfolded state of the electronic device 200 of FIGS. 2 to 4B.

The Hall sensor is an example of the first sensor 720, and the first sensor 720 is not limited to the Hall sensor.

According to various example embodiments, the fuel gauge 730 may measure information on the battery 760 (e.g., an available capacity (or a remaining capacity, a state of charge), a number of charging/discharging cycles, a voltage, a current, or a temperature of the battery 760). The fuel gauge 730 may transmit use state information of the battery 760 to the processor 710.

According to various example embodiments, the processor 710 may include various processing circuitry and determine whether the electronic device 700 is in the folding mode or the unfolding mode based on a detection result from the first sensor 720.

According to various example embodiments, at a battery information provision request in the folding mode of the electronic device 700, the processor 710 may calculate a first available time of the battery 760 in the folding mode based on a power consumption of the electronic device 700 in the folding mode and an available capacity of the battery 760. The power consumption of the electronic device 700 in the folding mode may be the amount of power used per time by the electronic device 700 in the folding mode. For example, the power consumption of the electronic device 700 in the folding mode may be 120 watt-hours (Wh), which is, however, merely an example for ease of description and thus, the power consumption of the electronic device 700 in the folding mode is not limited to 120 Wh. The processor 710 may display the available capacity and the first available time of the battery 760 on the sub-display 740.

According to various example embodiments, at a battery information provision request in the unfolding mode of the electronic device 700, the processor 710 may calculate a second available time of the battery 760 in the unfolding mode based on a power consumption of the electronic device 700 in the unfolding mode and the available capacity of the battery 760. The power consumption of the electronic device 700 in the unfolding mode may be the amount of power used per time by the electronic device 700 in the unfolding mode. For example, the power consumption of the electronic device 700 in the unfolding mode may be 100 Wh, which is, however, merely an example for ease of description and thus, the power consumption of the electronic device 700 in the unfolding mode is not limited to 100 Wh. The processor 710 may display the available capacity and the second available time of the battery 760 on the flexible display 750.

According to various example embodiments, a memory (e.g., the memory 130 of FIG. 1) of the electronic device 700 may store the power consumption of the electronic device 700 in the folding mode and the power consumption of the electronic device 700 in the unfolding mode.

According to various example embodiments, the processor 710 may record a pattern regarding a form in which a user uses the electronic device 700 (or the flexible display 750), and generate a custom mode using the recorded pattern. The custom mode may include, for example, an intermediate state of the electronic device 200 of FIGS. 2 to 4B. The processor 710 may verify the amount of power used per time by the electronic device 700 in the custom mode (hereinafter, referred to as the "power consumption of the electronic device 700 in the custom mode"), and store the power consumption of the electronic device 700 in the custom mode in the memory (e.g., the memory 130 of FIG. 1).

According to various example embodiments, the processor 710 may determine whether the electronic device 700 is in the custom mode based on the detection result from the first sensor 720. At a battery information provision request in the custom mode of the electronic device 700, the processor 710 may calculate a third available time of the battery 760 in the custom mode based on a power consumption of the electronic device 700 in the custom mode and the available capacity of the battery 760. The processor 710 may display the available capacity and the third available time of the battery 760 on the flexible display 750.

According to various example embodiments, the processor 710 may display a time needed for the battery 760 to be fully charged in the folding mode in the case of charging the electronic device 700 in the folding mode, on the sub-display 740.

According to various example embodiments, the processor 710 may display a time needed for the battery 760 to be fully charged in the unfolding mode in the case of charging the electronic device 700 in the unfolding mode, on the flexible display 750.

According to various example embodiments, when the user has a schedule, the processor 710 may verify a time left before the schedule of the user in the unfolding mode of the electronic device 700. The processor 710 may determine whether the battery 760 is usable until the schedule of the user based on the time left until the schedule of the user and the second available time of the battery 760 in the unfolding mode. In response to a determination that the battery 760 is not usable until the schedule of the user, the processor 710 may provide the user with information indicating that the battery 760 is not usable until the schedule of the user and request the user to switch from the unfolding mode to the folding mode.

Hereinafter, various example embodiments of providing battery information of the electronic device 700 will be described in greater detail with reference to FIGS. 8A, 8B, 9A, 9B, 10, 11, 12, 13A, 13B, 14A, 14B, 15, 16 and 17.

Figure 8A:
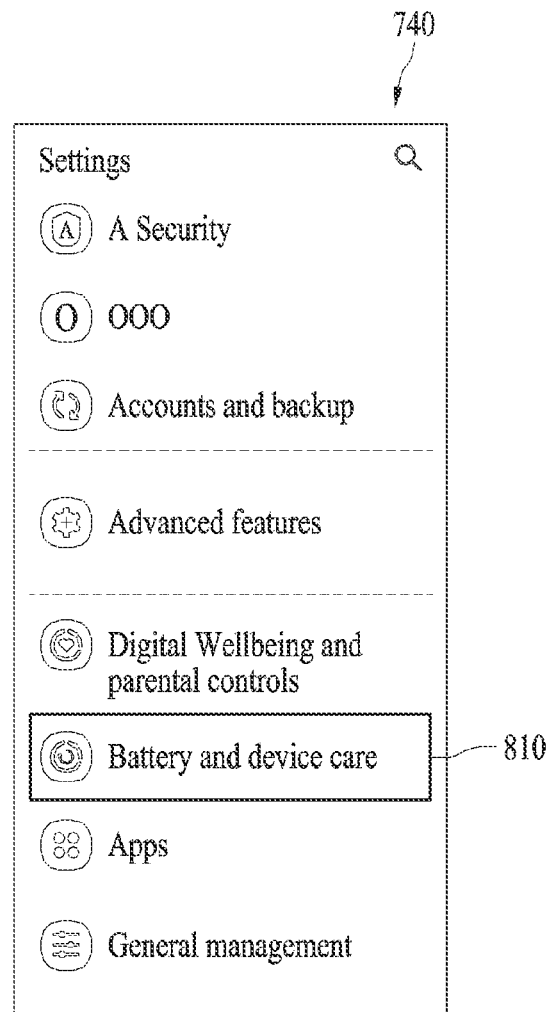
FIGS. 8A and 8B are diagrams illustrating an example of providing battery information in a folding mode of an electronic device according to various embodiments.
Figure 8B:
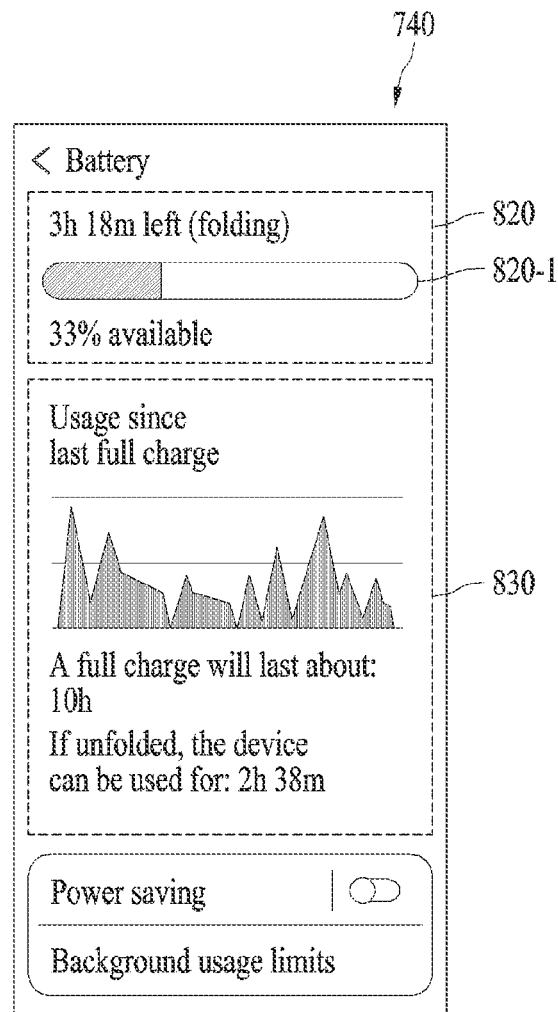

FIGS. 8A and 8B are diagrams illustrating an example of providing battery information in a folding mode of the electronic device 700 according to various embodiments.

An example of a setting screen displayed on the sub-display 740 in the folding mode of the electronic device 700 is illustrated in FIG. 8A.

According to various example embodiments, the processor 710 may receive a battery information provision request from the user. For example, the processor 710 may detect a user input (e.g., a touch gesture, an input by a stylus pen) for a battery and device care item 810 on the setting screen of FIG. 8A.

According to various example embodiments, the processor 710 may receive the available capacity of the battery 760 from the fuel gauge 730 at a battery information provision request. The processor 710 may calculate the first available time of the battery 760 in the folding mode based on the power consumption of the electronic device 700 in the folding mode and the available capacity of the battery 760. For example, when the available capacity of the battery 760 is 500 Wh and the power consumption of the electronic device 700 in the folding mode is 151.5 Wh, the processor 710 may calculate the first available time of the battery 760 in the folding mode as 3.3 hours (e.g., 3 hours and 18 minutes).

According to various example embodiments, the processor 710 may display the available capacity and the first available time of the battery 760 on the sub-display 740. For example, as in the example shown in FIG. 8B, the processor 710 may display the available capacity (e.g., 33%) and the first available time (e.g., 3 hours and 18 minutes) of the battery 760 in a first area 820 of the sub-display 740.

According to various example embodiments, the processor 710 may display an object 820-1 filled as much as the available capacity (e.g., 33%) of the battery 760 in the first area 820. The object 820-1 may have a bar shape, but is not limited thereto and may have various shapes (e.g., a circle shape).

According to various example embodiments, at a battery information provision request in the folding mode, the processor 710 may calculate the second available time of the battery 760 in the unfolding mode based on the power consumption of the electronic device 700 in the unfolding mode and the available capacity of the battery 760. For example, when the available capacity of the battery 760 is 500 Wh and the power consumption of the electronic device 700 in the unfolding mode is 190 Wh, the processor 710 may calculate the second available time of the battery 760 in the unfolding mode as 2.63 hours (e.g., 2 hours and 38 minutes). The processor 710 may display the second available time of the battery 760 on the sub-display 740. For example, as in the example shown in FIG. 8B, the processor 710 may display the second available time (e.g., 2 hours and 38 minutes) of the battery 760 in a second area 830 of the sub-display 740. As another example, the processor 710 may display the second available time (e.g., 2 hours and 38 minutes) in the first area 820 of the sub-display 740.

According to various example embodiments, the processor 710 may display a pop-up message including the available capacity, the first available time, and the second available time of the battery 760 on the sub-display 740 in the folding mode. Depending on the implementation, the second available time may be omitted from the pop-up message.

According to various example embodiments, the processor 710 may generate a report including the available capacity, the first available time, and the second available time of the battery 760 in the folding mode. Depending on the implementation, the second available time may be omitted from the report. The processor 710 may provide the generated report to the user through a messenger and/or transmit the generated report to a mail account of the user.

Figure 9A:
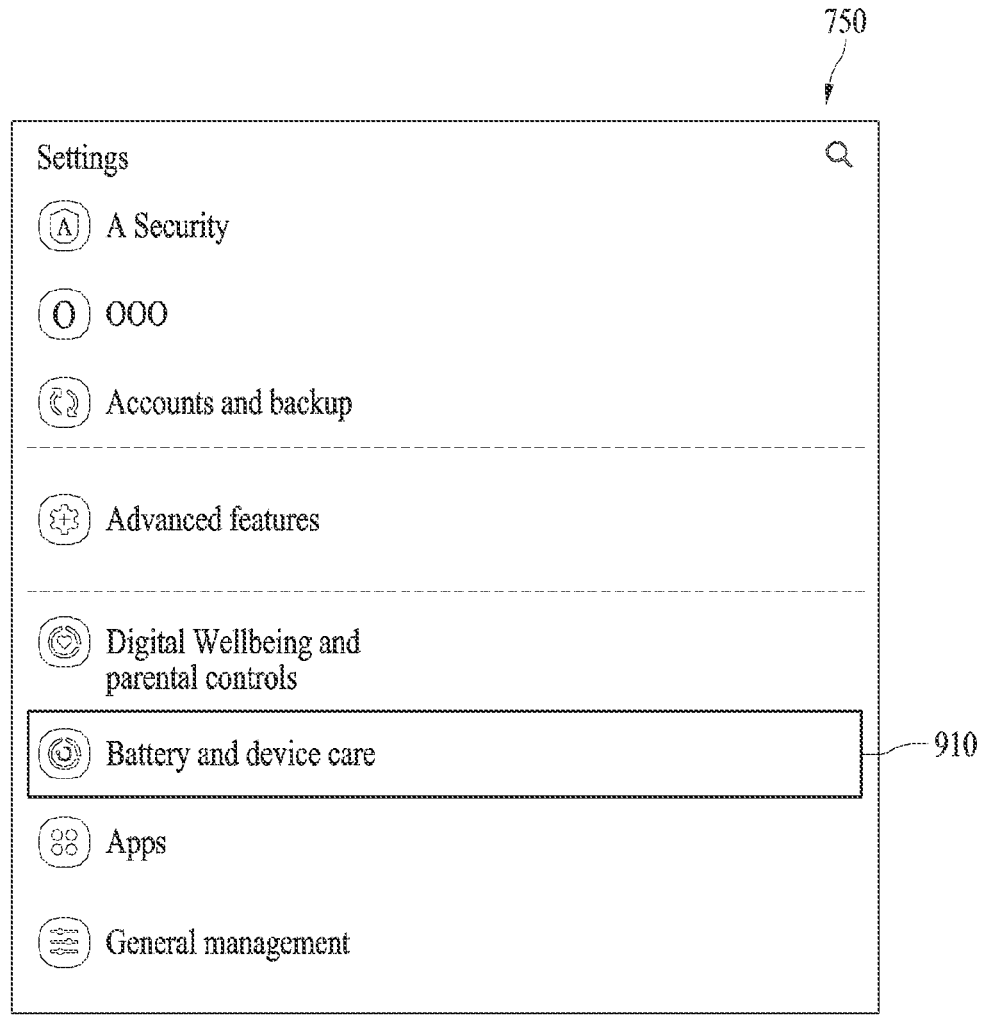
FIGS. 9A and 9B are diagrams illustrating an example of providing battery information in an unfolding mode of an electronic device according to various embodiments.
Figure 9B:
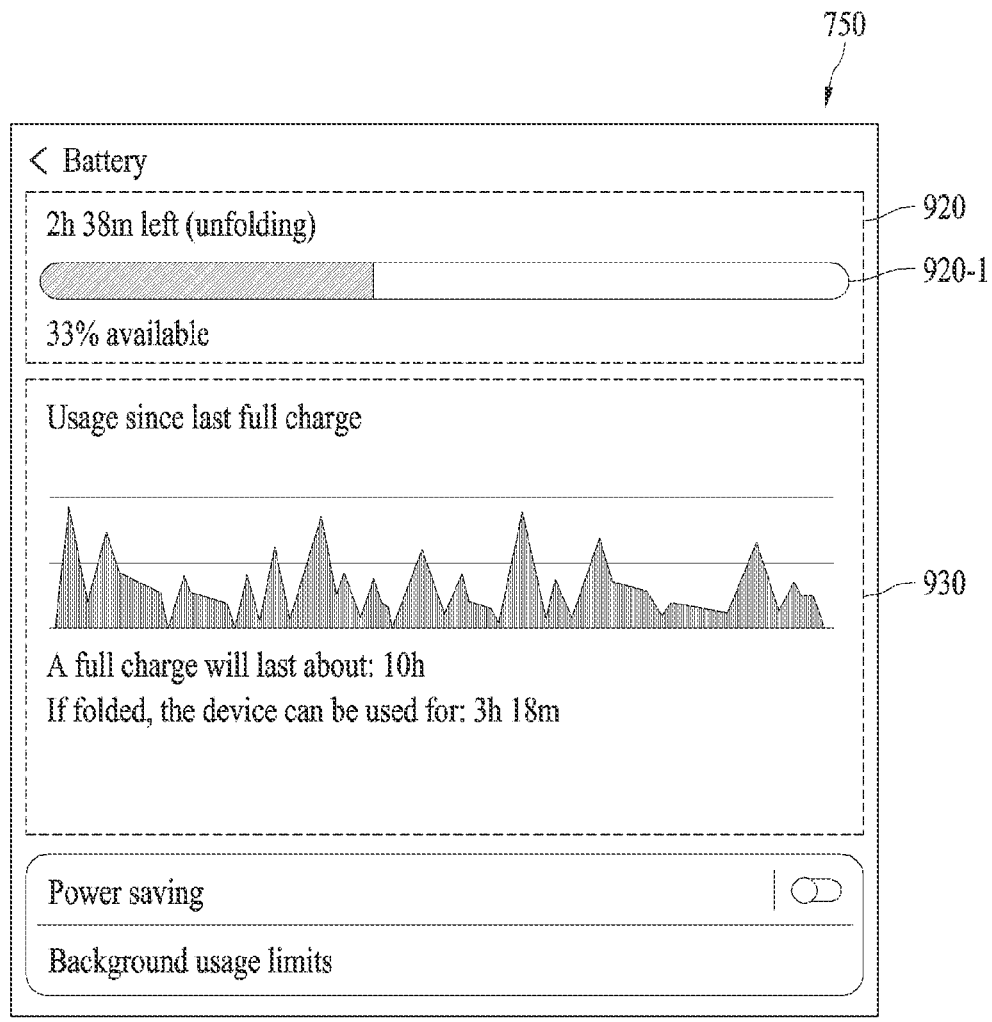

FIGS. 9A and 9B are diagrams illustrating an example of providing battery information in an unfolding mode of an electronic device according to various embodiments.

An example of a setting screen displayed on the flexible display 750 in the unfolding mode of the electronic device 700 is illustrated in FIG. 9A.

According to various example embodiments, the processor 710 may receive a battery information provision request from the user. For example, the processor 710 may detect a user input (e.g., a touch gesture, an input by a stylus pen) for a battery and device care item 910 on the setting screen of FIG. 9A.

According to various example embodiments, the processor 710 may receive the available capacity of the battery 760 from the fuel gauge 730 at a battery information provision request. The processor 710 may calculate the second available time of the battery 760 in the unfolding mode based on the power consumption of the electronic device 700 in the unfolding mode and the available capacity of the battery 760.

According to various example embodiments, the processor 710 may display the available capacity and the second available time of the battery 760 on the flexible display 750. For example, as in the example shown in FIG. 9B, the processor 710 may display the available capacity (e.g., 33%) and the second available time (e.g., 2 hours and 38 minutes) of the battery 760 in a first area 920 of the flexible display 750.

According to various example embodiments, the processor 710 may display an object 920-1 filled as much as the available capacity (e.g., 33%) of the battery 760 in the first area 920. The object 920-1 may have a bar shape, but is not limited thereto and may have various shapes (e.g., a circle shape).

According to various example embodiments, at a battery information provision request in the unfolding mode, the processor 710 may calculate the first available time of the battery 760 in the folding mode based on the power consumption of the electronic device 700 in the folding mode and the available capacity of the battery 760. The processor 710 may display the first available time of the battery 760 on the flexible display 750. For example, as in the example shown in FIG. 9B, the processor 710 may display the first available time (e.g., 3 hours and 18 minutes) of the battery 760 in a second area 930 of the flexible display 750. As another example, the processor 710 may display the first available time (e.g., 3 hours and 18 minutes) of the battery 760 in the first area 920 of the flexible display 750.

According to various example embodiments, the processor 710 may display a pop-up message including the available capacity, the first available time, and the second available time of the battery 760 on the flexible display 750 in the unfolding mode. Depending on the implementation, the first available time may be omitted from the pop-up message.

According to various example embodiments, the processor 710 may generate a report including the available capacity, the first available time, and the second available time of the battery 760 in the unfolding mode. Depending on the implementation, the first available time may be omitted from the report. The processor 710 may provide the generated report to the user through a messenger and/or transmit the generated report to a mail account of the user.

Figure 10:
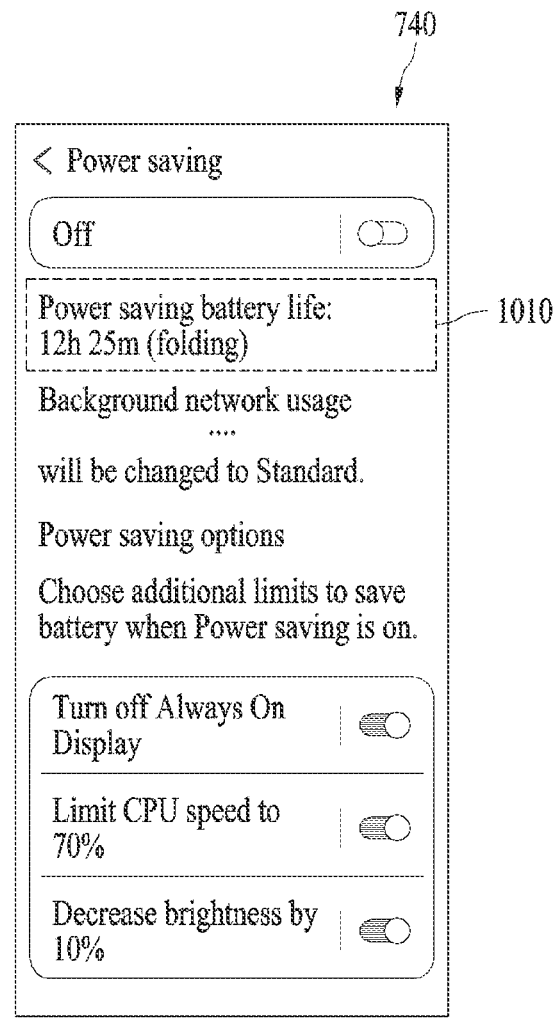
FIG. 10 is a diagram illustrating an example of providing battery information in a folding mode and a power saving mode of an electronic device according to various embodiments.

FIG. 10 is a diagram illustrating an example of providing battery information in a folding mode and a power saving mode of an electronic device according to various embodiments.

According to various example embodiments, at a battery information provision request in the folding mode and a power saving mode of the electronic device 700, the processor 710 may calculate an available time of the battery 760 in the folding mode and the power saving mode and display the available time on the sub-display 740. As in the example shown in FIG. 10, the processor 710 may display the available time of the battery during power saving in the folding mode in a first area 1010 on a power saving mode setting screen of the sub-display 740.

According to various example embodiments, the processor 710 may display a pop-up message including the available time of the battery during power saving in the folding mode and/or the available capacity of the battery 760 on the sub-display 740.

According to various example embodiments, the processor 710 may generate a report including the available time of the battery during power saving in the folding mode and/or the available capacity of the battery 760. The processor 710 may provide the generated report to the user through a messenger and/or transmit the generated report to a mail account of the user.

Figure 11:
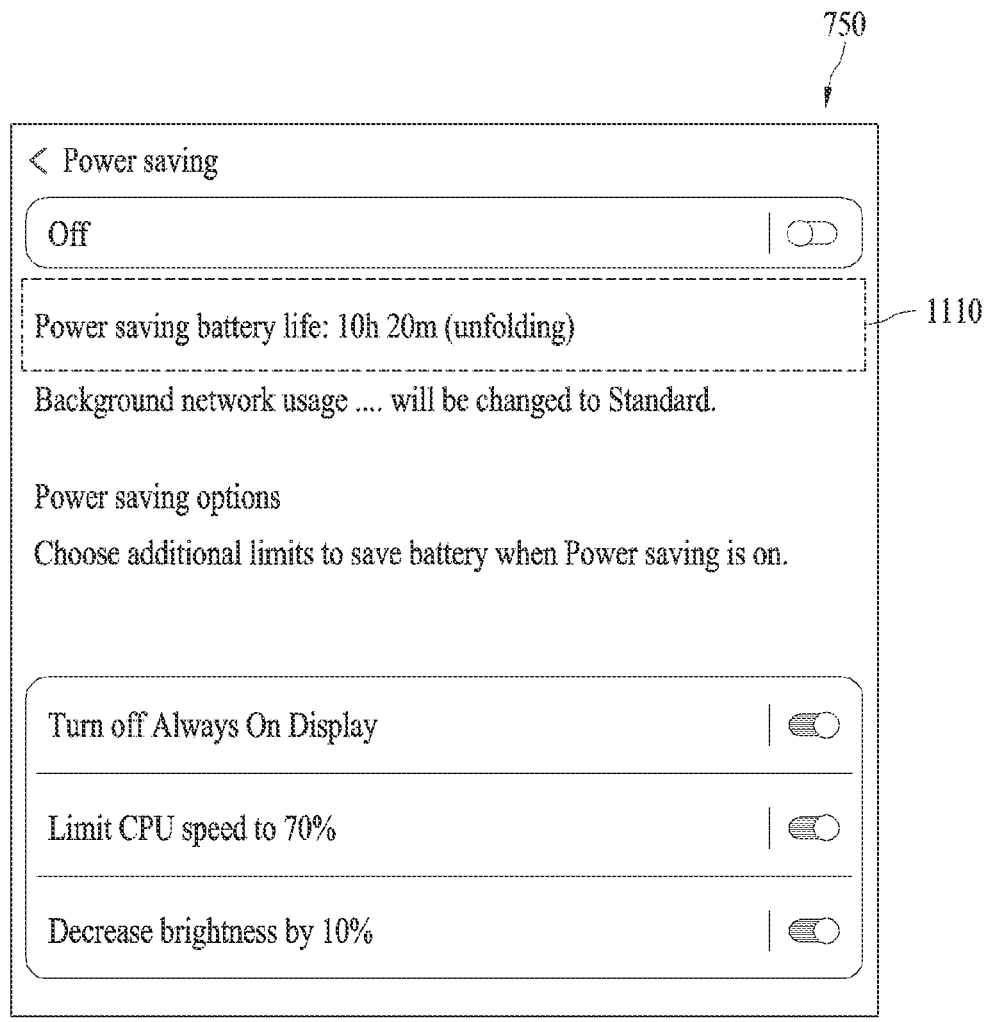
FIG. 11 is a diagram illustrating an example of providing battery information in an unfolding mode and a power saving mode of an electronic device according to various example embodiments.

FIG. 11 is a diagram illustrating an example of providing battery information in an unfolding mode and a power saving mode of an electronic device according to various embodiments.

According to various example embodiments, at a battery information provision request in the unfolding mode and the power saving mode of the electronic device 700, the processor 710 may calculate an available time of the battery 760 in the unfolding mode and the power saving mode and display the available time on the flexible display 750. As in the example shown in FIG. 11, the processor 710 may display the available time of the battery during power saving in the unfolding mode in a first area 1110 on a power saving mode setting screen of the flexible display 750.

According to various example embodiments, the processor 710 may display a pop-up message including the available time of the battery during power saving in the unfolding mode and/or the available capacity of the battery 760 on the flexible display 750.

According to various example embodiments, the processor 710 may generate a report including the available time of the battery during power saving in the unfolding mode and/or the available capacity of the battery 760. The processor 710 may provide the generated report to the user through a messenger and/or transmit the generated report to a mail account of the user.

Figure 12:
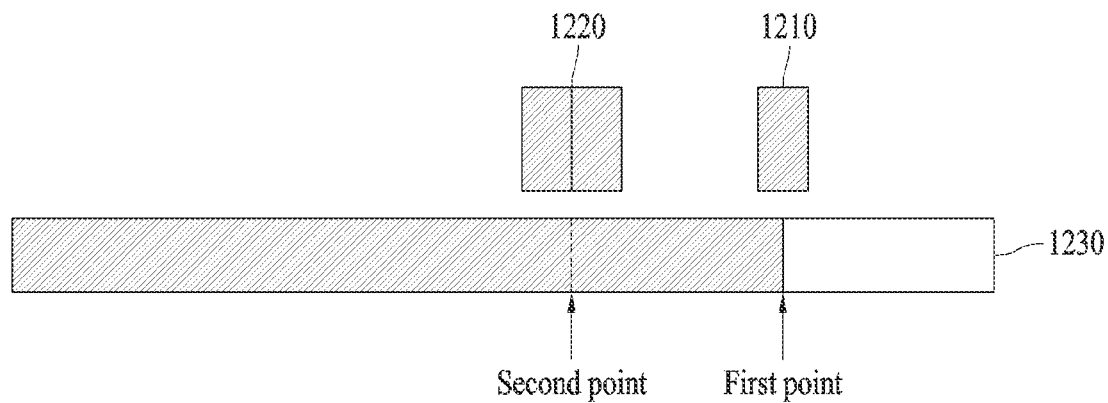
FIG. 12 is a diagram illustrating an example of displaying battery information of an electronic device according to various embodiments.

FIG. 12 is a diagram illustrating an example of displaying battery information of an electronic device according to various embodiments.

According to various example embodiments, the processor 710 may display an object 1230 (e.g., the object 820-1 of FIG. 8B) on the sub-display 740 (e.g., in the first area 820 of FIG. 8B) in the folding mode of the electronic device 700. The processor 710 may display a first object 1210 in a shape corresponding to the folding mode in an area adjacent to a first point (or a first position) on the object 1230 (e.g., the object 820-1 of FIG. 8B), and display a second object 1220 in a shape corresponding to the unfolding mode in an area adjacent to a second point (or a second position) on the object 1230 (e.g., the object 820-1 of FIG. 8B). The first point may correspond to the first available time of the battery 760 in the folding mode, and the second point may correspond to the second available time of the battery 760 in the unfolding mode.

According to various example embodiments, the processor 710 may display an object 1230 (e.g., the object 920-1 of FIG. 9B) on the flexible display 750 (e.g., in the first area 920 of FIG. 9B) in the unfolding mode of the electronic device 700. The processor 710 may display a first object 1210 in a shape corresponding to the folding mode in an area adjacent to a first point on the object 1230 (e.g., the object 920-1 of FIG. 9B), and display a second object 1220 in a shape corresponding to the unfolding mode in an area adjacent to a second point on the object 1230 (e.g., the object 920-1 of FIG. 9B).

According to various example embodiments, the processor 710 may display a pop-up message including the objects 1210 to 1230 shown in FIG. 12 on the sub-display 740 in the folding mode. The processor 710 may display the pop-up message including the objects 1210 to 1230 shown in FIG. 12 on the flexible display 750 in the unfolding mode.

According to various example embodiments, the processor 710 may generate a report including the objects 1210, 1220 and 1230 (which may be referred to as 1210 to 1230) shown in FIG. 12 in the folding mode, and provide the generated report to the user through a messenger and/or transmit the generated report to a mail account of the user. The processor 710 may generate a report including the objects 1210 to 1230 shown in FIG. 12 in the unfolding mode, and provide the generated report to the user through a messenger and/or transmit the generated report to a mail account of the user.

According to various example embodiments, in the example shown in FIG. 12, the processor 710 may visually represent that the available time of the battery 760 decreases when the user uses the electronic device 700 in the unfolding mode than in the folding mode.

Figure 13A:
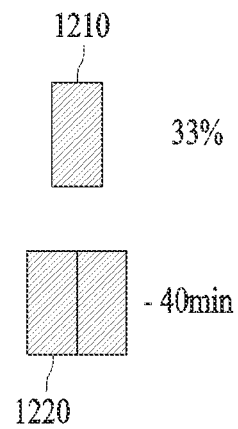
FIGS. 13A and 13B are diagrams illustrating another example of displaying battery information of an electronic device according to various embodiments.
Figure 13B:
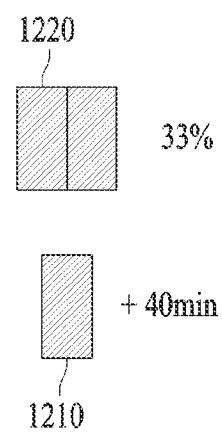
Figure 14A:
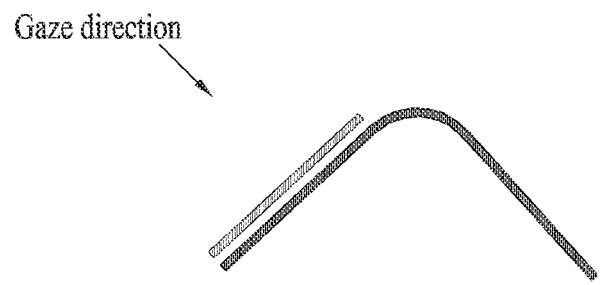
FIGS. 14A, 14B, 15, 16 and 17 are diagrams illustrating an example of providing battery information in a custom mode of an electronic device according to various embodiments.
Figure 14B:
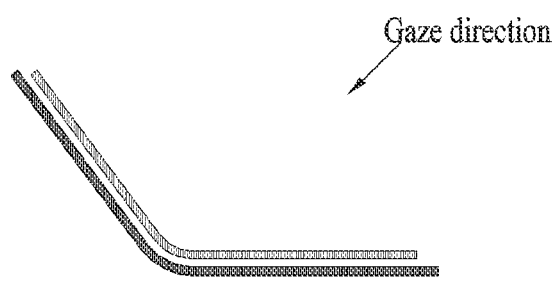

FIGS. 13A and 13B are diagrams illustrating another example of displaying battery information of an electronic device according to various embodiments.

According to various example embodiments, in the example shown in FIG. 13A, the processor 710 may display a first object 1210 in a shape corresponding to the folding mode on the sub-display 740 and display the available capacity of the battery 760 in an area (e.g., a right area) adjacent to the first object 1210, in the folding mode of the electronic device 700. The processor 710 may display a second object 1220 in a shape corresponding to the unfolding mode on the sub-display 740 and display a variation in the available time of the battery 760 in an area (e.g., a right area) adjacent to the second object 1220, in the folding mode of the electronic device 700. For example, as in the example shown in FIG. 13A, the processor 710 may display information (e.g., −40 minutes) indicating that the available time of the battery 760 decreases by 40 minutes in the case of changing from the folding mode to the unfolding mode, in an area adjacent to the second object 1220.

According to various example embodiments, in the example shown in FIG. 13B, the processor 710 may display the second object 1220 on the flexible display 750 and display the available capacity of the battery 760 in an area (e.g., a right area) adjacent to the second object 1220, in the unfolding mode of the electronic device 700. The processor 710 may display the first object 1210 on the flexible display 750 and display a variation in the available time of the battery 760 in an area (e.g., a right area) adjacent to the first object 1210, in the unfolding mode of the electronic device 700. For example, as in the example shown in FIG. 13B, the processor 710 may display information (e.g., +40 minutes) indicating that the available time of the battery 760 increases by 40 minutes in the case of changing from the unfolding mode to the folding mode, in an area adjacent to the first object 1210.

According to various example embodiments, the processor 710 may display a pop-up message including the first object 1210, the available capacity of the battery 760, the second object 1220, and the variation (e.g., −40 minutes) in the available time of the battery 760 shown in FIG. 13A, on the sub-display 740 in the folding mode. The processor 710 may display a pop-up message including the second object 1220, the available capacity of the battery 760, the first object 1210, and the variation (e.g., +40 minutes) in the available time of the battery 760 shown in FIG. 13B, on the flexible display 750 in the unfolding mode.

According to various example embodiments, the processor 710 may generate a report including the first object 1210, the available capacity of the battery 760, the second object 1220, and the variation (e.g., −40 minutes) in the available time of the battery 760 shown in FIG. 13A and transmit the generated report to a messenger account and/or a mail account of the user in the folding mode. The processor 710 may generate a report including the second object 1220, the available capacity of the battery 760, the first object 1210, and the variation (e.g., +40 minutes) in the available time of the battery 760 shown in FIG. 13B and transmit the generated report to a messenger account and/or a mail account of the user in the unfolding mode.

FIGS. 14A, 14B, 15, 16 and 17 (which may be referred to as FIGS. 14A to 17) are diagrams illustrating an example of providing battery information in a custom mode of an electronic device according to various embodiments.

According to various example embodiments, the processor 710 may record a pattern regarding an angle at which the user bends and uses the electronic device 700 (or the flexible display 750), and generate a custom mode using the recorded pattern. In an example embodiment, when the electronic device 700 is folded in an out-folding manner, the processor 710 may verify that the user bends and uses the electronic device 700 in the form shown in FIG. 14A, and generate a custom mode corresponding to the form shown in FIG. 14A. In another example embodiment, when the electronic device 700 is folded in an in-folding manner, the processor 710 may verify that the user bends and uses the electronic device 700 in the form shown in FIG. 14B, and generate a custom mode corresponding to the form shown in FIG. 14B.

Figure 15:
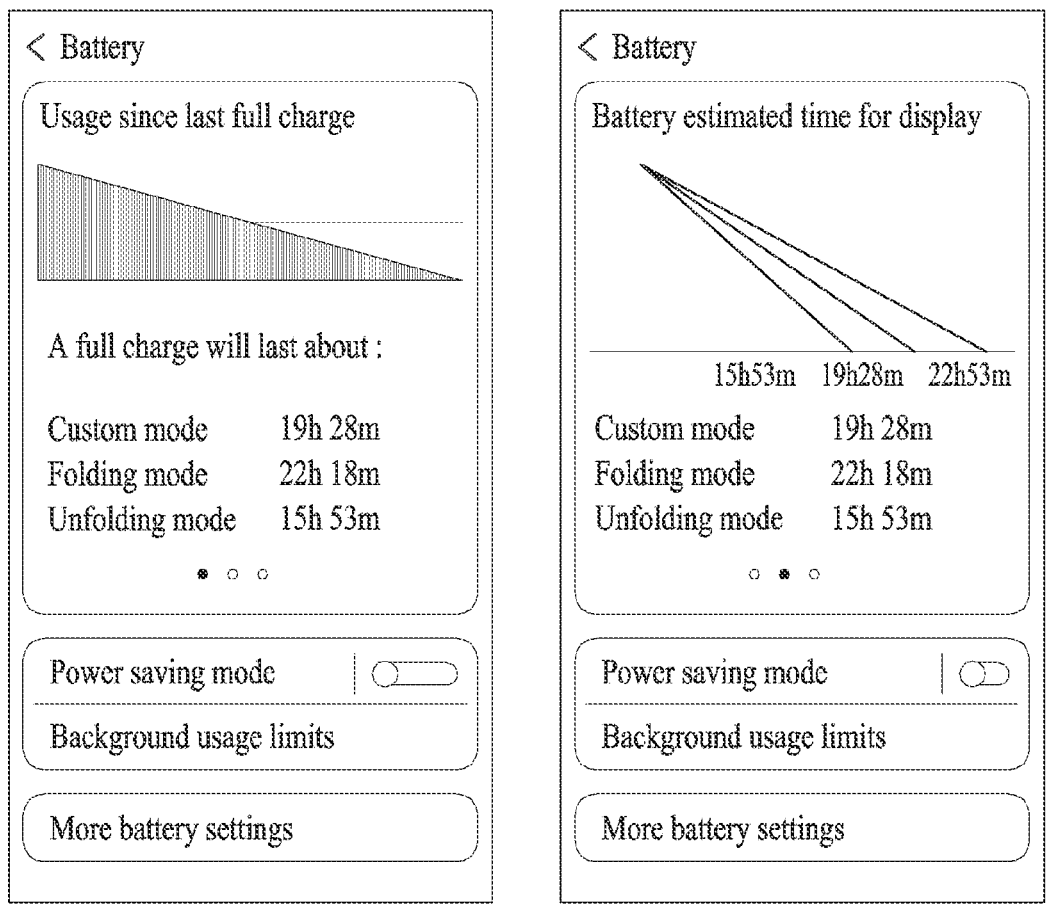

According to various example embodiments, as in the example shown in FIG. 15, the processor 710 may display available times of the battery 760 in respective modes (e.g., the folding mode, the unfolding mode, and the custom mode) on a display (e.g., the sub-display 740 or the flexible display 750) when the battery 760 is fully charged.

According to various example embodiments, the processor 710 may determine that the electronic device 700 is in the custom mode based on a detection result from the first sensor 720, and at a battery information provision request in the custom mode, calculate a third available time of the battery 760 in the custom mode based on a power consumption of the electronic device 700 in the custom mode and the available capacity of the battery 760. The processor 710 may display the available capacity and the third available time of the battery 760 on the flexible display 750.

According to various example embodiments, at a battery information provision request in the custom mode, the processor 710 may further calculate the first available time of the battery 760 in the folding mode based on the power consumption of the electronic device 700 in the folding mode and the available capacity of the battery 760, and further calculate the second available time of the battery 760 in the unfolding mode based on the power consumption of the electronic device 700 in the unfolding mode and the available capacity of the battery 760. The processor 710 may further display the first available time and the second available time of the battery 760 on the flexible display 750. The third available time of the battery 760 may be shorter than the first available time of the battery 760 and longer than the second available time of the battery 760. The user may verify that changing from the custom mode to the folding mode increases the available time of the battery 760 at the current available capacity of the battery 760. The user may verify that changing from the custom mode to the unfolding mode decreases the available time of the battery 760 at the current available capacity of the battery 760.

According to various example embodiments, at a battery information provision request in the custom mode and a power saving mode of the electronic device 700, the processor 710 may calculate an available time of the battery 760 in the custom mode and the power saving mode and display the available time on the flexible display 750.

Figure 16:
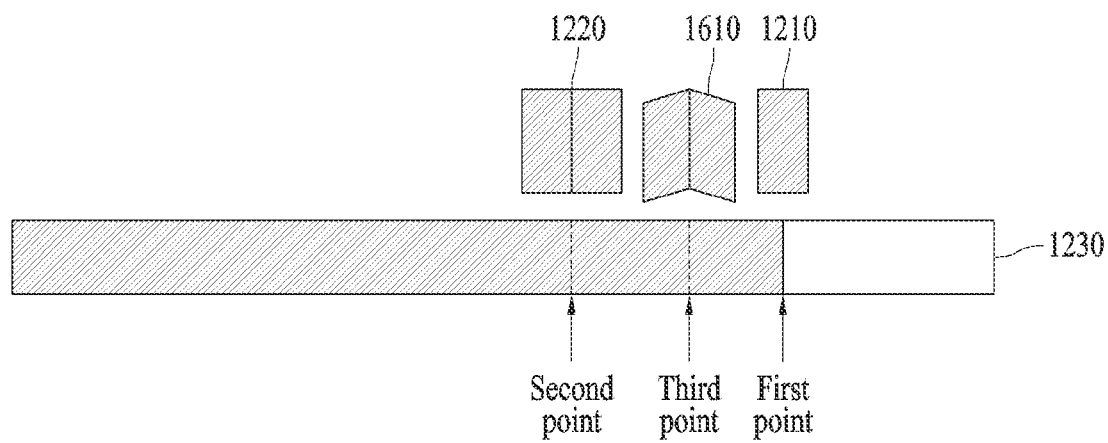

According to various example embodiments, in the example shown in FIG. 16, the processor 710 may display an object 1230 filled with the available capacity of the battery 760 on the flexible display 750 in the custom mode of the electronic device 700. The processor 710 may display the first object 1210 in a shape corresponding to the folding mode in an area adjacent to a first point on the object 1230, the second object 1220 in a shape corresponding to the unfolding mode in an area adjacent to a second point on the object 1230, and a third object 1610 in a shape corresponding to the custom mode in an area adjacent to a third point on the object 1230. The third point may correspond to the third available time of the battery 760.

According to various example embodiments, the processor 710 may display a pop-up message including the objects 1210 to 1230 and 1610 shown in FIG. 16 on the flexible display 750 in the custom mode.

According to various example embodiments, the processor 710 may generate a report including the objects 1210 to 1230 and 1610 shown in FIG. 16 in the custom mode, and provide the generated report to the user through a messenger and/or transmit the generated report to a mail account of the user.

According to various example embodiments, in the example shown in FIG. 16, the processor 710 may visually represent that the available time of the battery 760 decreases as the user uses the electronic device 700 in the unfolding mode.

Figure 17:
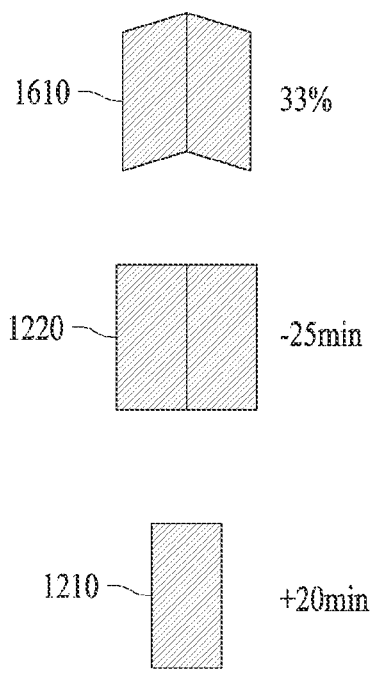

According to various example embodiments, in the example shown in FIG. 17, the processor 710 may display the third object 1610 on the flexible display 750 and display the available capacity of the battery 760 in an area (e.g., a right area) adjacent to the third object 1610, in the custom mode of the electronic device 700. The processor 710 may display the second object 1220 on the flexible display 750 and display a variation in the available time of the battery 760 in an area (e.g., a right area) adjacent to the second object 1220. For example, as in the example shown in FIG. 17, the processor 710 may display information (e.g., −25 minutes) indicating that the available time of the battery 760 decreases by 25 minutes in the case of changing from the custom mode to the unfolding mode, in an area adjacent to the second object 1220. The processor 710 may display the first object 1210 on the flexible display 750 and display a variation in the available time of the battery 760 in an area (e.g., a right area) adjacent to the first object 1210. For example, as in the example shown in FIG. 17, the processor 710 may display information (e.g., +20 minutes) indicating that the available time of the battery 760 increases by 20 minutes in the case of changing from the custom mode to the folding mode, in an area adjacent to the first object 1210.

According to various example embodiments, the processor 710 may display a pop-up message including the third object 1610, the available capacity of the battery 760, the second object 1220, the variation (e.g., −25 minutes) in the available time of the battery 760 in the case of changing from the custom mode to the unfolding mode, the first object 1210, and the variation (e.g., +20 minutes) in the available time of the battery 760 in the case of changing from the custom mode to the folding mode shown in FIG. 17, on the flexible display 750 in the custom mode.

According to various example embodiments, the processor 710 may generate a report including the third object 1610, the available capacity of the battery 760, the second object 1220, the variation (e.g., −25 minutes) in the available time of the battery 760 in the case of changing from the custom mode to the unfolding mode, the first object 1210, and the variation (e.g., +20 minutes) in the available time of the battery 760 in the case of changing from the custom mode to the folding mode shown in FIG. 17, on the flexible display 750 in the custom mode. The processor 710 may provide the generated report to the user through a messenger and/or transmit the generated report to a mail account of the user.

FIGS. 18A, 18B, 18C, 19, 20A, 20B, 21, 22 and 23 (which may be referred to as FIGS. 18A to 23) are diagrams illustrating another example of an electronic device according to various embodiments.

Figure 18A:
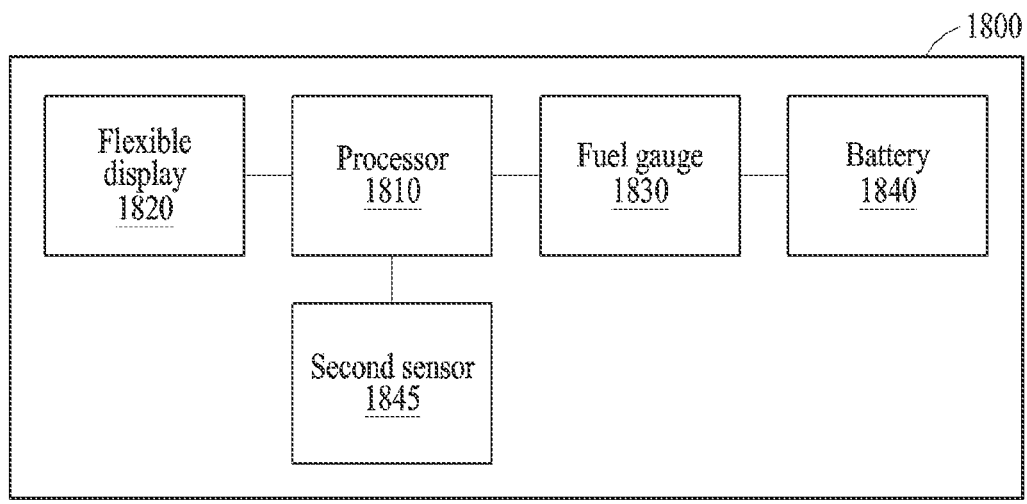
FIGS. 18A, 18B, 18C, 19, 20A, 20B, 21, 22 and 23 are diagrams illustrating another example of an electronic device according to various embodiments.

An electronic device 1800 of FIG. 18A is a block diagram illustrating an example configuration of the electronic device 101 of FIG. 1 or the electronic device 500 of FIGS. 5A to 6B, and may be a rollable electronic device.

According to various example embodiments, the electronic device 1800 may include a processor (e.g., including processing circuitry) 1810 (e.g., the processor 120 of FIG. 1), a flexible display 1820 (e.g., the flexible display 530 of FIG. 5A), a fuel gauge 1830, a battery 1840 (e.g., the battery 189 of FIG. 1), and a second sensor 1845.

At least one of the components of the electronic device 1800 may be the same as or similar to at least one of the components of the electronic device 101 of FIG. 1, the electronic device 200 of FIGS. 2 to 4B, the electronic device 500 of FIGS. 5A to 6B, or the electronic device 700 of FIG. 7, and thus a repeated description thereof may not be provided.

According to various example embodiments, the flexible display 1820 may be included in the display module 160 of FIG. 1.

According to various example embodiments, the fuel gauge 1830 may measure information on the battery 1840 (e.g., an available capacity, a number of charging/discharging cycles, a voltage, a current, or a temperature of the battery 1840). The fuel gauge 1830 may transmit use state information of the battery 1840 to the processor 1810.

According to various example embodiments, the second sensor 1845 may be included in the sensor module 176 of FIG. 1. The second sensor 1845 may detect expansion and/or reduction of the flexible display 1820. The processor 1810 may determine whether the electronic device 1800 is in a first mode or a second mode based on a detection result from the second sensor 1845. The first mode may be a mode in which the flexible display 1820 is reduced, and the second mode may be a mode in which the flexible display 1820 is expanded.

According to various example embodiments, at a battery information provision request in the first mode in which the flexible display 1820 is reduced, the processor 1810 may calculate a fourth available time of the battery 1840 in the first mode based on a power consumption of the electronic device 1800 in the first mode and an available capacity of the battery 1840. The power consumption of the electronic device 1800 in the first mode may be the amount of power used per time by the electronic device 1800 in the first mode. The first mode may indicate a closed state of the electronic device 500 of FIGS. 5A to 6B.

According to various example embodiments, the processor 1810 may display the available capacity and the fourth available time of the battery 1840 on the reduced flexible display 1820 (e.g., the flexible display 530 with the reduced display screen of FIG. 5A). For example, in the example shown in FIG. 18B, the processor 1810 may display the available capacity and the fourth available time of the battery 1840 in a first area 1850 of the reduced flexible display 1820.

Figure 18B:
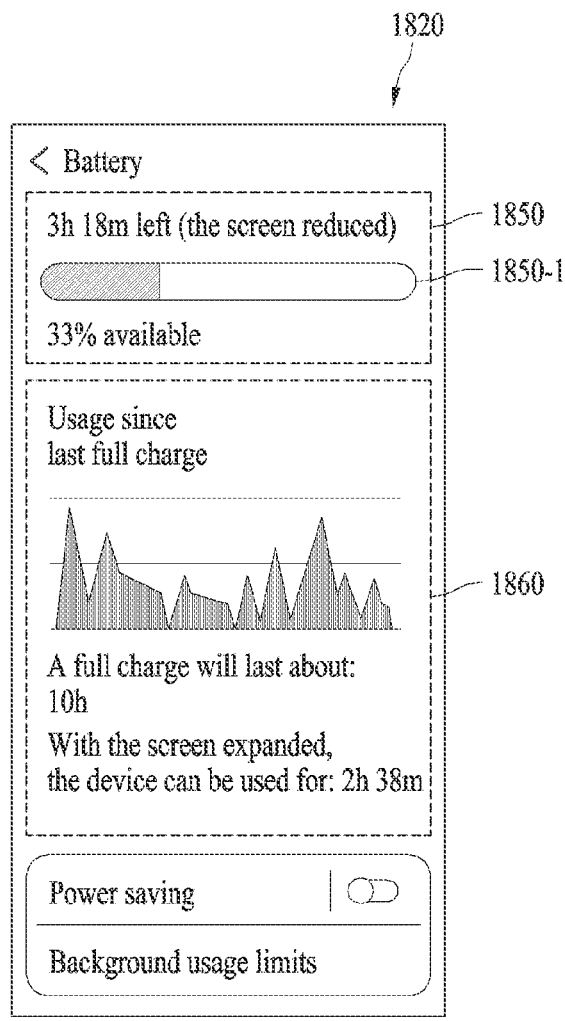

According to various example embodiments, in the example shown in FIG. 18B, the processor 1810 may display an object 1850-1 filled as much as the available capacity of the battery 1840 in the first area 1850 of the reduced flexible display 1820 in the first mode of the electronic device 1800.

According to various example embodiments, at a battery information provision request in the first mode, the processor 1810 may further calculate a fifth available time of the battery 1840 in the second mode based on a power consumption of the electronic device 1800 in the second mode and the available capacity of the battery 1840. The power consumption of the electronic device 1800 in the second mode may be the amount of power used per time by the electronic device 1800 in the second mode. The second mode may indicate an open state of the electronic device 500 of FIGS. 5A to 6B. As in the example shown in FIG. 18B, the processor 1810 may display the fifth available time of the battery 1840 in a second area 1860 of the reduced flexible display 1820.

According to various example embodiments, the processor 1810 may display a pop-up message including the available capacity, the fourth available time, and the fifth available time of the battery 1840 on the reduced flexible display 1820 in the first mode. Depending on the implementation, the fifth available time may be omitted from the pop-up message.

According to various example embodiments, the processor 1810 may generate a report including the available capacity, the fourth available time, and the fifth available time of the battery 1840 in the first mode. Depending on the implementation, the fifth available time may be omitted from the report. The processor 1810 may provide the generated report to the user through a messenger and/or transmit the generated report to a mail account of the user.

According to various example embodiments, at a battery information provision request in the second mode in which the flexible display 1820 is expanded, the processor 1810 may calculate a fifth available time of the battery 1840 in the second mode based on a power consumption of the electronic device 1800 in the second mode and the available capacity of the battery 1840.

According to various example embodiments, the processor 1810 may display the available capacity and the fifth available time of the battery 1840 on the expanded flexible display 1820 (e.g., the flexible display 530 with the expanded display screen of FIG. 5B). For example, in the example shown in FIG. 18C, the processor 1810 may display the available capacity and the fifth available time of the battery 1840 in a first area 1870 of the expanded flexible display 1820.

Figure 18C:
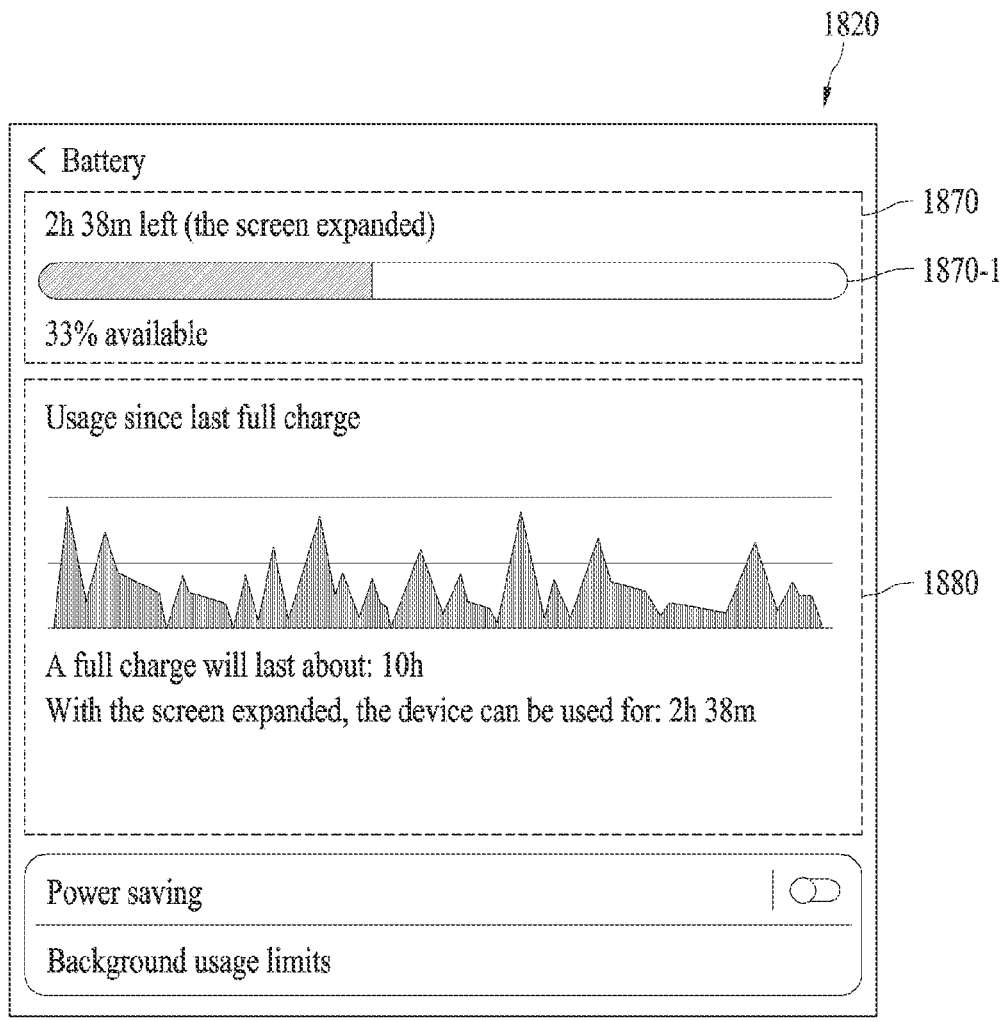

According to various example embodiments, in the example shown in FIG. 18C, the processor 1810 may display an object 1870-1 filled as much as the available capacity of the battery 1840 in the first area 1870 of the expanded flexible display 1820 in the second mode of the electronic device 1800.

According to various example embodiments, at a battery information provision request in the second mode, the processor 1810 may further calculate a fourth available time of the battery 1840 in the first mode based on a power consumption of the electronic device 1800 in the first mode and the available capacity of the battery 1840. As in the example shown in FIG. 18C, the processor 1810 may display the fourth available time of the battery 1840 in a second area 1880 of the expanded flexible display 1820.

According to various example embodiments, the processor 1810 may display a pop-up message including the available capacity, the fourth available time, and the fifth available time of the battery 1840 on the expanded flexible display 1820 in the second mode. Depending on the implementation, the fourth available time may be omitted from the pop-up message.

According to various example embodiments, the processor 1810 may generate a report including the available capacity, the fourth available time, and the fifth available time of the battery 1840 in the first mode. Depending on the implementation, the fourth available time may be omitted from the report. The processor 1810 may provide the generated report to the user through a messenger and/or transmit the generated report to a mail account of the user.

According to various example embodiments, a memory (e.g., the memory 130 of FIG. 1) of the electronic device 1800 may store the power consumption of the electronic device 1800 in the first mode and the power consumption of the electronic device 1800 in the second mode.

According to various example embodiments, at a battery information provision request in the first mode and a power saving mode of the electronic device 1800, the processor 1810 may calculate an available time of the battery 1840 in the first mode and the power saving mode and display the available time on the reduced flexible display 1820.

According to various example embodiments, the processor 1810 may display a pop-up message including the available time and the available capacity of the battery 1840 on the reduced flexible display 1820 in the first mode and the power saving mode.

According to various example embodiments, the processor 1810 may generate a report including the available time and the available capacity of the battery 1840 in the first mode and the power saving mode. The processor 1810 may provide the generated report to the user through a messenger and/or transmit the generated report to a mail account of the user.

According to various example embodiments, at a battery information provision request in the second mode and a power saving mode of the electronic device 1800, the processor 1810 may calculate an available time of the battery 1840 in the second mode and the power saving mode and display the available time on the expanded flexible display 1820.

According to various example embodiments, the processor 1810 may display a pop-up message including the available time and the available capacity of the battery 1840 on the expanded flexible display 1820 in the second mode and the power saving mode.

According to various example embodiments, the processor 1810 may generate a report including the available time and the available capacity of the battery 1840 in the second mode and the power saving mode. The processor 1810 may provide the generated report to the user through a messenger and/or transmit the generated report to a mail account of the user.

Figure 19:
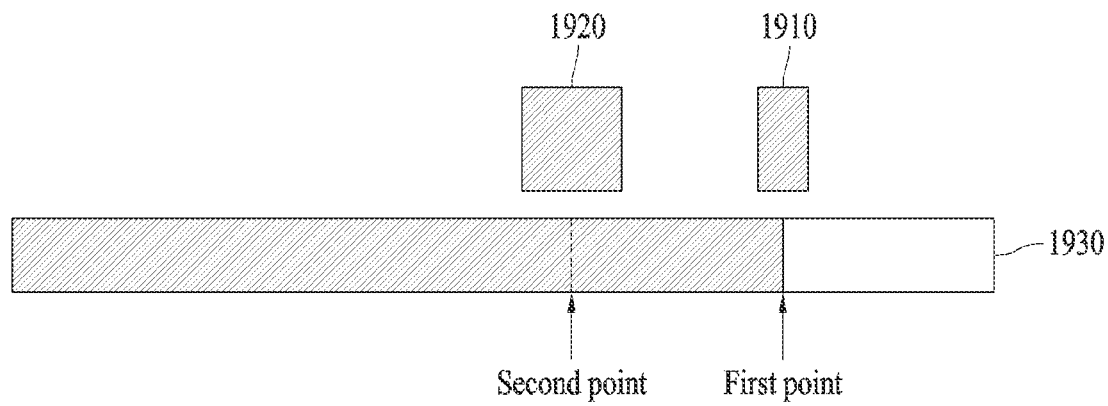

According to various example embodiments, in the example shown in FIG. 19, the processor 1810 may display an object 1930 (e.g., the object 1850-1 of FIG. 18B) filled as much as the available capacity of the battery 1840 on the reduced flexible display 1820 in the first mode of the electronic device 1800. The processor 1810 may display a first object 1910 in a shape corresponding to the first mode in an area adjacent to a first point (or a first position) on the object 1930, and display a second object 1920 in a shape corresponding to the second mode in an area adjacent to a second point (or a second position) on the object 1930. In the example shown in FIG. 19, the first point may correspond to the fourth available time of the battery 1840 in the first mode, and the second point may correspond to the fifth available time of the battery 1840 in the second mode.

According to various example embodiments, in the example shown in FIG. 19, the processor 1810 may display an object 1930 (e.g., the object 1870-1 of FIG. 18C) on the expanded flexible display 1820 in the second mode of the electronic device 1800. The processor 1810 may display a first object 1910 in a shape corresponding to the first mode in an area adjacent to a first point on the object 1930, and display a second object 1920 in a shape corresponding to the second mode in an area adjacent to a second point on the object 1930.

According to various example embodiments, the processor 1810 may display a pop-up message including the objects 1910, 1920 and 1930 (which may be referred to as 1910 to 1930) shown in FIG. 19 on the reduced flexible display 1820 in the first mode. The processor 1810 may display the pop-up message including the objects 1910 to 1930 shown in FIG. 19 on the expanded flexible display 1820 in the second mode.

According to various example embodiments, the processor 1810 may generate a report including the objects 1910 to 1930 shown in FIG. 19 in the first mode and/or the second mode, and provide the generated report to the user through a messenger and/or transmit the generated report to a mail account of the user.

According to various example embodiments, in the example shown in FIG. 19, the processor 1810 may visually represent that the available time of the battery 1840 decreases when the user uses the expanded flexible display 1820.

Figure 20A:
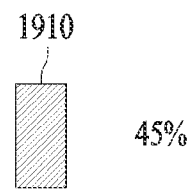
Figure 20A:
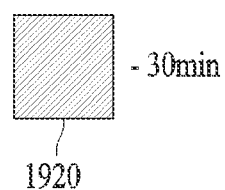

According to various example embodiments, in the example shown in FIG. 20A, the processor 1810 may display the first object 1910 on the reduced flexible display 1820 and display the available capacity of the battery 1840 in an area (e.g., a right area) adjacent to the first object 1910, in the first mode of the electronic device 1800. The processor 1810 may display the second object 1920 on the reduced flexible display 1820 and display a variation in the available time of the battery 1840 in an area (e.g., a right area) adjacent to the second object 1920, in the first mode of the electronic device 1800. For example, as in the example shown in FIG. 20A, the processor 1810 may display information (e.g., −30 minutes) indicating that the available time of the battery 1840 decreases by 30 minutes in the case of changing from the first mode to the second mode, in an area adjacent to the second object 1920.

According to various example embodiments, the processor 1810 may display a pop-up message including the first object 1910, the available capacity of the battery 1840, the second object 1920, and the variation (e.g., −45 minutes) in the available time of the battery 1840 shown in FIG. 20A, on the reduced flexible display 1820 in the first mode.

According to various example embodiments, the processor 1810 may generate a report including the first object 1910, the available capacity of the battery 1840, the second object 1920, and the variation (e.g., −45 minutes) in the available time of the battery 1840 shown in FIG. 20A and transmit the generated report to a messenger account and/or a mail account of the user in the first mode.

Figure 20B:
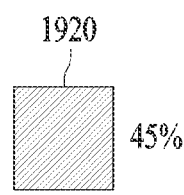
Figure 20B:
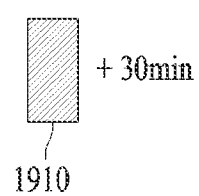
Figure 21:
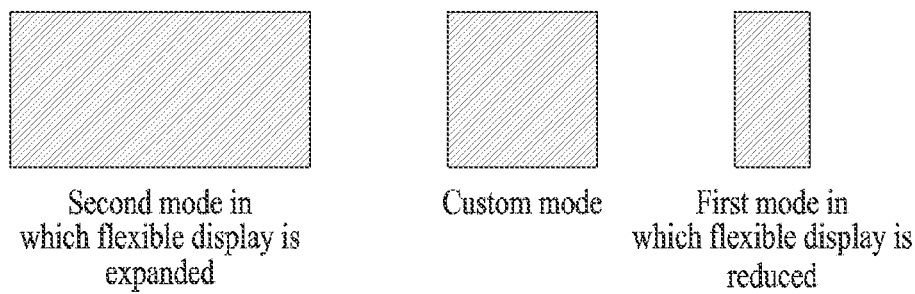

According to various example embodiments, in the example shown in FIG. 20B, the processor 1810 may display the second object 1920 on the expanded flexible display 1820 and display the available capacity of the battery 1840 in an area (e.g., a right area) adjacent to the second object 1920, in the second mode of the electronic device 1800. The processor 1810 may display the first object 1910 on the expanded flexible display 1820 and display a variation in the available time of the battery 1840 in an area (e.g., a right area) adjacent to the first object 1910, in the second mode of the electronic device 1800. For example, as in the example shown in FIG. 20B, the processor 1810 may display information (e.g., +30 minutes) indicating that the available time of the battery 1840 increases by 30 minutes in the case of changing from the second mode to the first mode, in an area adjacent to the first object 1910.

According to various example embodiments, the processor 1810 may display a pop-up message including the second object 1920, the available capacity of the battery 1840, the first object 1910, and the variation (e.g., +30 minutes) in the available time of the battery 1840 shown in FIG. 20B, on the expanded flexible display 1820 in the second mode.

According to various example embodiments, the processor 1810 may generate a report including the second object 1920, the available capacity of the battery 1840, the first object 1910, and the variation (e.g., +30 minutes) in the available time of the battery 1840 shown in FIG. 20B and transmit the generated report to a messenger account and/or a mail account of the user in the second mode.

According to various example embodiments, the processor 1810 may record a pattern regarding a form in which the user uses the flexible display 1820, and generate a custom mode using the recorded pattern. In the example shown in FIG. 21, the processor 1810 may generate a custom mode in which the flexible display 1820 is used partially expanded when the user uses the partially expanded flexible display 1820 rather than the fully expanded flexible display 1820. The processor 710 may verify the power consumption of the electronic device 1800 in the custom mode of FIG. 21, and store the power consumption of the electronic device 1800 in the custom mode in a memory (e.g., the memory 130 of FIG. 1).

According to various example embodiments, at a battery information provision request in the custom mode of the electronic device 1800, the processor 1810 may calculate a sixth available time of the battery 1840 in the custom mode based on a power consumption of the electronic device 1800 in the custom mode and the available capacity of the battery 1840. The processor 1810 may display the available capacity and the sixth available time of the battery 1840 on the partially expanded flexible display 1820.

According to various example embodiments, at a battery information provision request in the custom mode of the electronic device 1800, the processor 1810 may further calculate the fourth available time of the battery 1840 in the first mode based on the power consumption of the electronic device 1800 in the first mode and the available capacity of the battery 1840, and further calculate the fifth available time of the battery 1840 in the second mode based on the power consumption of the electronic device 1800 in the second mode and the available capacity of the battery 1840. The processor 1810 may further display the fourth available time and the fifth available time on the partially expanded flexible display 1820 in the custom mode. The sixth available time of the battery 1840 may be shorter than the fourth available time of the battery 1840 and longer than the fifth available time of the battery 1840. The user may verify that changing from the custom mode to the first mode increases the available time of the battery 1840 at the current available capacity of the battery 1840. The user may verify that changing from the custom mode to the second mode decreases the available time of the battery 1840 at the current available capacity of the battery 1840.

According to various example embodiments, at a battery information provision request in the custom mode and a power saving mode of the electronic device 1800, the processor 1810 may calculate an available time of the battery 1840 in the custom mode and the power saving mode and display the available time on the partially expanded flexible display 1820.

Figure 22:
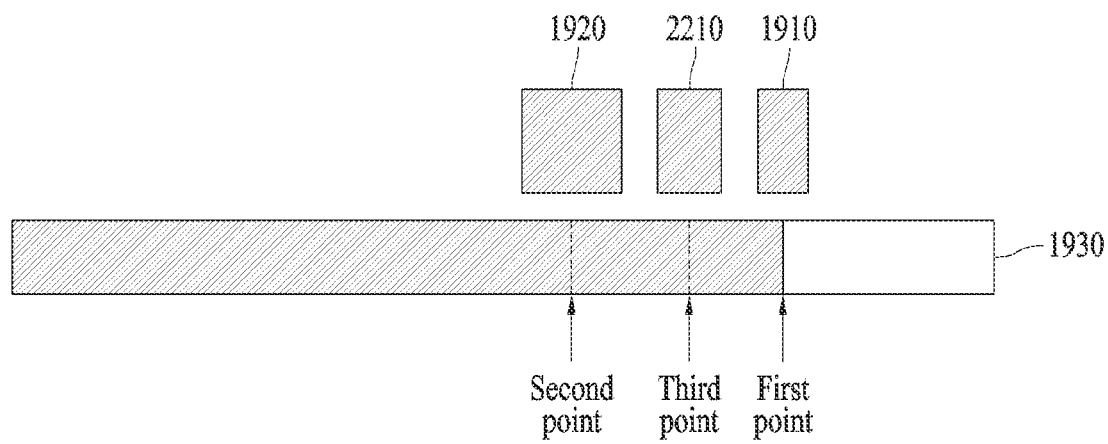

According to various example embodiments, in the example shown in FIG. 22, the processor 1810 may display an object 1930 filled with the available capacity of the battery 1840 on the partially expanded flexible display 1820 in the custom mode of the electronic device 1800. The processor 1810 may display the first object 1910 in a shape corresponding to the first mode in an area adjacent to a first point on the object 1930, the second object 1920 in a shape corresponding to the second mode in an area adjacent to a second point on the object 1930, and a third object 2210 in a shape corresponding to the custom mode in an area adjacent to a third point on the object 1930. The third point of FIG. 22 may correspond to the sixth available time of the battery 1840.

According to various example embodiments, the processor 1810 may display a pop-up message including the objects 1910 to 1930 and 2210 shown in FIG. 22 on the partially expanded flexible display 1820 in the custom mode.

According to various example embodiments, the processor 1810 may generate a report including the objects 1910 to 1930 and 2210 shown in FIG. 22 in the custom mode, and provide the generated report to the user through a messenger and/or transmit the generated report to a mail account of the user.

According to various example embodiments, in the example shown in FIG. 22, the processor 1810 may visually represent that the available time of the battery 1840 decreases as the user uses the electronic device 1800 in the unfolding mode.

Figure 23:
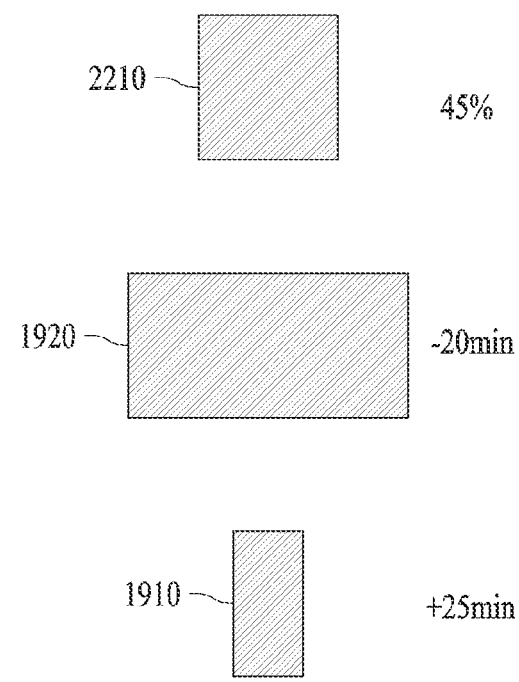

According to various example embodiments, in the example shown in FIG. 23, the processor 1810 may display the third object 2210 on the partially expanded flexible display 1820 and display the available capacity of the battery 1840 in an area (e.g., a right area) adjacent to the third object 2210, in the custom mode of the electronic device 1800. The processor 1810 may display the second object 1920 on the partially expanded flexible display 1820 and a variation in the available time of the battery 1840 in an area (e.g., a right area) adjacent to the second object 1920, and display the first object 1910 on the partially expanded flexible display 1820 and a variation in the available time of the battery 1840 in an area (e.g., a right area) adjacent to the first object 1910. For example, as in the example shown in FIG. 23, the processor 1810 may display information (e.g., −20 minutes) indicating that the available time of the battery 1840 decreases by 20 minutes in the case of changing from the custom mode to the second mode, in an area adjacent to the second object 1920. The processor 1810 may display information (e.g., +25 minutes) indicating that the available time of the battery 1840 increases by 25 minutes in the case of changing from the custom mode to the first mode, in an area adjacent to the first object 1910.

According to various example embodiments, the processor 1810 may display a pop-up message including the third object 2210, the available capacity of the battery 1840, the second object 1920, the variation (e.g., −20 minutes) in the available time of the battery 1840 in the case of changing from the custom mode to the second mode, the first object 1910, and the variation (e.g., +25 minutes) in the available time of the battery 1840 in the case of changing from the custom mode to the first mode shown in FIG. 23, on the partially expanded flexible display 1820 in the custom mode.

According to various example embodiments, the processor 1810 may generate a report including the third object 2210, the available capacity of the battery 1840, the second object 1920, the variation (e.g., −20 minutes) in the available time of the battery 1840 in the case of changing from the custom mode to the second mode, the first object 1910, and the variation (e.g., +25 minutes) in the available time of the battery 1840 in the case of changing from the custom mode to the first mode shown in FIG. 23, in the custom mode. The processor 1810 may provide the generated report to the user through a messenger and/or transmit the generated report to a mail account of the user.

According to various example embodiments, the processor 1810 may display a time needed for the battery 1840 to be fully charged in the first mode in the case of charging the electronic device 1800 in the first mode, on the reduced flexible display 1820.

According to various example embodiments, the processor 1810 may display a time needed for the battery 1840 to be fully charged in the second mode in the case of charging the electronic device 1800 in the second mode, on the expanded flexible display 1820.

According to various example embodiments, when the user has a schedule, the processor 1810 may verify a time left before the schedule of the user in the second mode of the electronic device 1800. The processor 1810 may determine whether the battery 1840 is usable until the schedule of the user based on the time left until the schedule of the user and the fifth available time of the battery 1840. In response to a determination that the battery 1840 is not usable until the schedule of the user, the processor 1810 may provide the user with information indicating that the battery 1840 is not usable until the schedule of the user and request the user to use the reduced flexible display 1820 and/or to switch to the power saving mode.

FIGS. 24, 25, 26A and 26B (which may be referred to as FIGS. 24 to 26B) are diagrams illustrating another example of an electronic device according to various embodiments.

Figure 24:
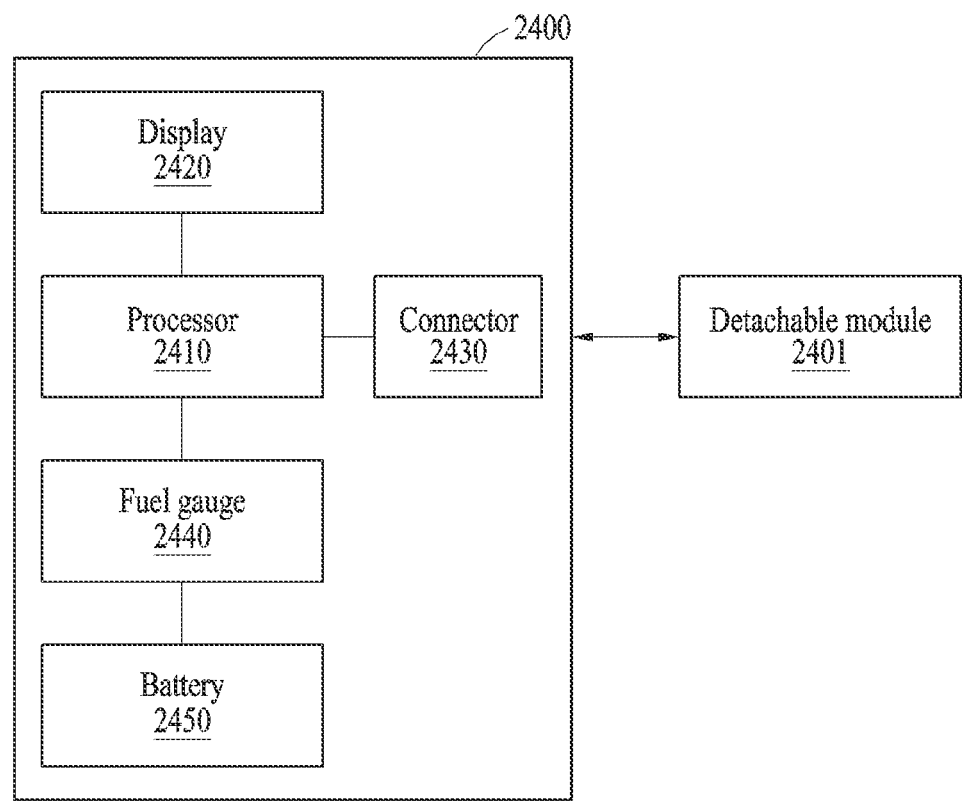

Referring to FIG. 24, an electronic device 2400 (e.g., the electronic device 101 of FIG. 1, the electronic device 200 of FIGS. 2 to 4B, the electronic device 500 of FIGS. 5A to 6B, the electronic device 700 of FIG. 7, the electronic device 1800 of FIG. 18A) may include a processor (e.g., including processing circuitry) 2410 (e.g., the processor 120 of FIG. 1, the processor 710 of FIG. 7, the processor 1810 of FIG. 18A), a display 2420 (e.g., the display module 160 of FIG. 1, the sub-display 740 of FIG. 7, the flexible display 750 of FIG. 7, the flexible display 1820 of FIG. 18A), a connector 2430 (e.g., the connecting terminal 178 of FIG. 1), a fuel gauge 2440 (e.g., the fuel gauge 730 of FIG. 7, the fuel gauge 1830 in FIG. 18A), and a battery 2450 (e.g., the battery 189 in FIG. 1, the battery 760 of FIG. 7, and the battery 1840 of FIG. 18A).

At least one of the components of the electronic device 2400 may be the same as or similar to at least one of the components of the electronic device 101 of FIG. 1, the electronic device 200 of FIGS. 2 to 4B, the electronic device 500 of FIGS. 5A to 6B, the electronic device 700 of FIG. 7, or the electronic device 1800 of FIG. 18A, and thus a repeated description thereof may not be provided.

According to various example embodiments, the connector 2430 may be electrically connected to a detachable module 2401.

According to various example embodiments, the detachable module 2401 may include at least one of a display module, a camera module, a speaker module, a keyboard module, or the like.

According to various example embodiments, at a battery information provision request in a detaching mode in which the module 2401 is detached from the electronic device 2400, the processor 2410 may calculate a seventh available time of the battery 2450 in the detaching mode based on a power consumption of the electronic device 2400 in the detaching mode and an available capacity of the battery 2450. The power consumption of the electronic device 2400 in the detaching mode may be the amount of power used per time by the electronic device 2400 when the module 2401 is detached. The processor 2410 may display the available capacity and the seventh available time of the battery 2450 on the display 2420.

According to various example embodiments, the processor 2410 may display a pop-up message including the available capacity and the seventh available time of the battery 2450 on the display 2420 in the detaching mode.

According to various example embodiments, the processor 2410 may generate a report including the available capacity and the seventh available time of the battery 2450 in the detaching mode. The processor 2410 may provide the generated report to the user through a messenger and/or transmit the generated report to a mail account of the user.

According to various example embodiments, at a battery information provision request in an attaching mode in which the module 2401 is attached to the electronic device 2400 through the connector 2430, the processor 2410 may calculate an eighth available time of the battery 2450 in the attaching mode based on a power consumption of the electronic device 2400 in the attaching mode and the available capacity of the battery 2450. The power consumption of the electronic device 2400 in the attaching mode may be the amount of power used per time by the electronic device 2400 when the module 2401 is attached. The processor 2410 may display the available capacity and the eighth available time of the battery 2450 on the display 2420. In an example embodiment, when a display module is attached to the electronic device 2400, the processor 2410 may display the available capacity and the eighth available time of the battery 2450 on at least one of the display 2420 or the attached display module.

According to various example embodiments, the processor 2410 may display a pop-up message including the available capacity and the eighth available time of the battery 2450 on the display 2420 in the attaching mode.

According to various example embodiments, the processor 2410 may generate a report including the available capacity and the eighth available time of the battery 2450 in the attaching mode. The processor 2410 may provide the generated report to the user through a messenger and/or transmit the generated report to a mail account of the user.

According to various example embodiments, a memory (e.g., the memory 130 of FIG. 1) of the electronic device 2400 may store the power consumption of the electronic device 2400 in the detaching mode in which the module 2401 is detached and the power consumption of the electronic device 2400 in the attaching mode in which the module 2401 is attached.

According to various example embodiments, at a battery information provision request in the detaching mode and a power saving mode of the electronic device 2400, the processor 2410 may calculate an available time of the battery 2450 in the detaching mode and the power saving mode and display the available time on the display 2420.

According to various example embodiments, the processor 2410 may display a pop-up message including the available time and the available capacity of the battery 2450 on the display 2420 in the detaching mode and the power saving mode.

According to various example embodiments, the processor 2410 may generate a report including the available time and the available capacity of the battery 2450 in the detaching mode and the power saving mode. The processor 2410 may provide the generated report to the user through a messenger and/or transmit the generated report to a mail account of the user.

According to various example embodiments, at a battery information provision request in the attaching mode and a power saving mode of the electronic device 2400, the processor 2410 may calculate an available time of the battery 2450 in the attaching mode and the power saving mode and display the available time on the display 2420. In an example embodiment, when a display module is attached to the electronic device 2400, the processor 2410 may display the available time of the battery 2450 in the attaching mode and the power saving mode on at least one of the display 2420 or the attached display module.

According to various example embodiments, the processor 2410 may display a pop-up message including the available time and the available capacity of the battery 2450 on the display 2420 in the attaching mode and the power saving mode.

According to various example embodiments, the processor 2410 may generate a report including the available time and the available capacity of the battery 2450 in the attaching mode and the power saving mode. The processor 2410 may provide the generated report to the user through a messenger and/or transmit the generated report to a mail account of the user.

Figure 25:
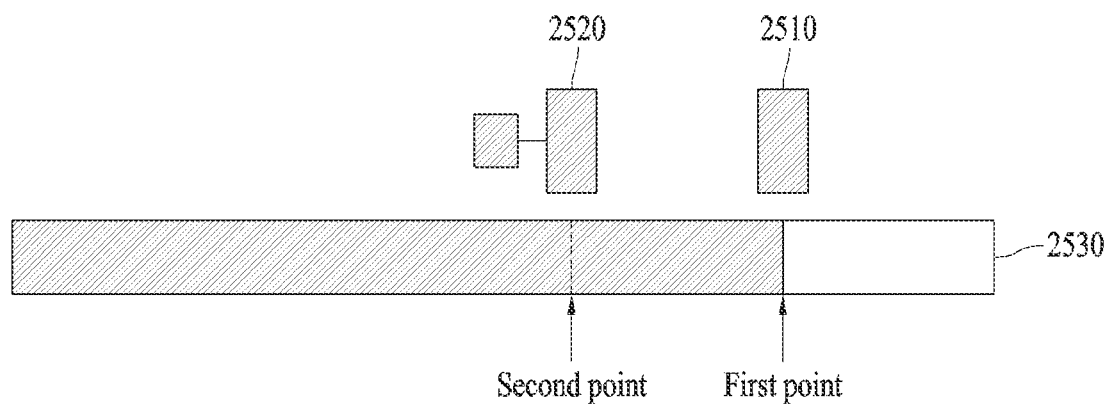

According to various example embodiments, in the example shown in FIG. 25, the processor 2410 may display an object 2530 filled as much as the available capacity of the battery 2450 on the display 2420 in the attaching mode or the detaching mode of the electronic device 2400. The processor 2410 may display a first object 2510 in a shape corresponding to the detaching mode in an area adjacent to a first point (or a first position) on the object 2530, and display a second object 2520 in a shape corresponding to the attaching mode in an area adjacent to a second point (or a second position) on the object 2530. In the example shown in FIG. 25, the first point may correspond to the seventh available time of the battery 2450 in the detaching mode, and the second point may correspond to the eighth available time of the battery 2450 in the attaching mode.

According to various example embodiments, the processor 2410 may display a pop-up message including the objects 2510, 2520 and 2530 (which may be referred to as 2510 to 2530) shown in FIG. 25 on the display 2420 in the detaching mode and the attaching mode.

According to various example embodiments, the processor 2410 may generate a report including the objects 2510 to 2530 shown in FIG. 25 in the detaching mode and the attaching mode, and provide the generated report to the user through a messenger and/or transmit the generated report to a mail account of the user.

According to various example embodiments, in the example shown in FIG. 25, the processor 2410 may visually represent that the available time of the battery 2450 decreases when the user uses the electronic device 2400 while attaching the module 2401 thereto.

According to various example embodiments, in the example shown in FIG. 26A, the processor 2410 may display the first object 2510 on the display 2420 and display the available capacity (e.g., 50%) of the battery 2450 in an area (e.g., a right area) adjacent to the first object 2510, in the detaching mode of the electronic device 2400. The processor 2410 may display the second object 2520 on the display 2420 and display a variation in the available time of the battery 2450 in an area (e.g., a right area) adjacent to the second object 2520, in the detaching mode of the electronic device 2400. For example, as in the example shown in FIG. 26A, the processor 2410 may display information (e.g., −30 minutes) indicating that the available time of the battery 2450 decreases by 30 minutes in the case where the module 2401 is attached to the electronic device 2400, in an area adjacent to the second object 2520.

According to various example embodiments, the processor 2410 may display a pop-up message including the first object 2510, the available capacity of the battery 2450, the second object 2520, and the variation (e.g., −30 minutes) in the available time of the battery 2450 shown in FIG. 26A, on the display 2420 in the detaching mode.

The processor 2410 may generate a report including the first object 2510, the available capacity of the battery 2450, the second object 2520, and the variation (e.g., −30 minutes) in the available time of the battery 2450 shown in FIG. 26A and transmit the generated report to a messenger account and/or a mail account of the user in the detaching mode.

According to various example embodiments, in the example shown in FIG. 26B, the processor 2410 may display the second object 2520 on the display 2420 and display the available capacity (e.g., 50%) of the battery 2450 in an area (e.g., a right area) adjacent to the second object 2520, in the attaching mode of the electronic device 2400. The processor 2410 may display the first object 2510 on the display 2420 and display a variation in the available time of the battery 2450 in an area (e.g., a right area) adjacent to the first object 2510, in the attaching mode of the electronic device 2400. For example, as in the example shown in FIG. 26B, the processor 2410 may display information (e.g., +30 minutes) indicating that the available time of the battery 2450 increases by 30 minutes in the case where the module 2401 is detached from the electronic device 2400, in an area adjacent to the first object 2510.

According to various example embodiments, the processor 2410 may display a pop-up message including the second object 2520, the available capacity of the battery 2450, the first object 2510, and the variation (e.g., +30 minutes) in the available time of the battery 2450 shown in FIG. 26B, on the display 2420 in the attaching mode.

The processor 2410 may generate a report including the second object 2520, the available capacity of the battery 2450, the first object 2510, and the variation (e.g., −30 minutes) in the available time of the battery 2450 shown in FIG. 26B and transmit the generated report to a messenger account and/or a mail account of the user in the attaching mode.

According to various example embodiments, the processor 2410 may display a time needed for the battery 2450 to be fully charged in the detaching mode in the case of charging the electronic device 2400 in the detaching mode, on the display 2420.

According to various example embodiments, the processor 2410 may display a time needed for the battery 2450 to be fully charged in the attaching mode in the case of charging the electronic device 2400 in the attaching mode, on the display 2420.

According to various example embodiments, when the user has a schedule, the processor 2410 may verify a time left before the schedule of the user in the attaching mode of the electronic device 2400. The processor 2410 may determine whether the battery 2450 is usable until the schedule of the user based on the time left until the schedule of the user and the eighth available time of the battery 2450. In response to a determination that the battery 2450 is not usable until the schedule of the user, the processor 2410 may provide the user with information indicating that the battery 2450 is not usable until the schedule of the user and request the user to detach the module 2401 and/or to switch to the power saving mode.

According to various example embodiments, the module 2401 may be detached from or attached to a bar-type electronic device. The description of the attaching mode of the electronic device 2400 may apply to the bar-type electronic device from which the module 2401 is detached, and the description of the detaching mode of the electronic device 2400 may apply to the bar-type electronic device to which the module 2401 is attached.

Figure 27:
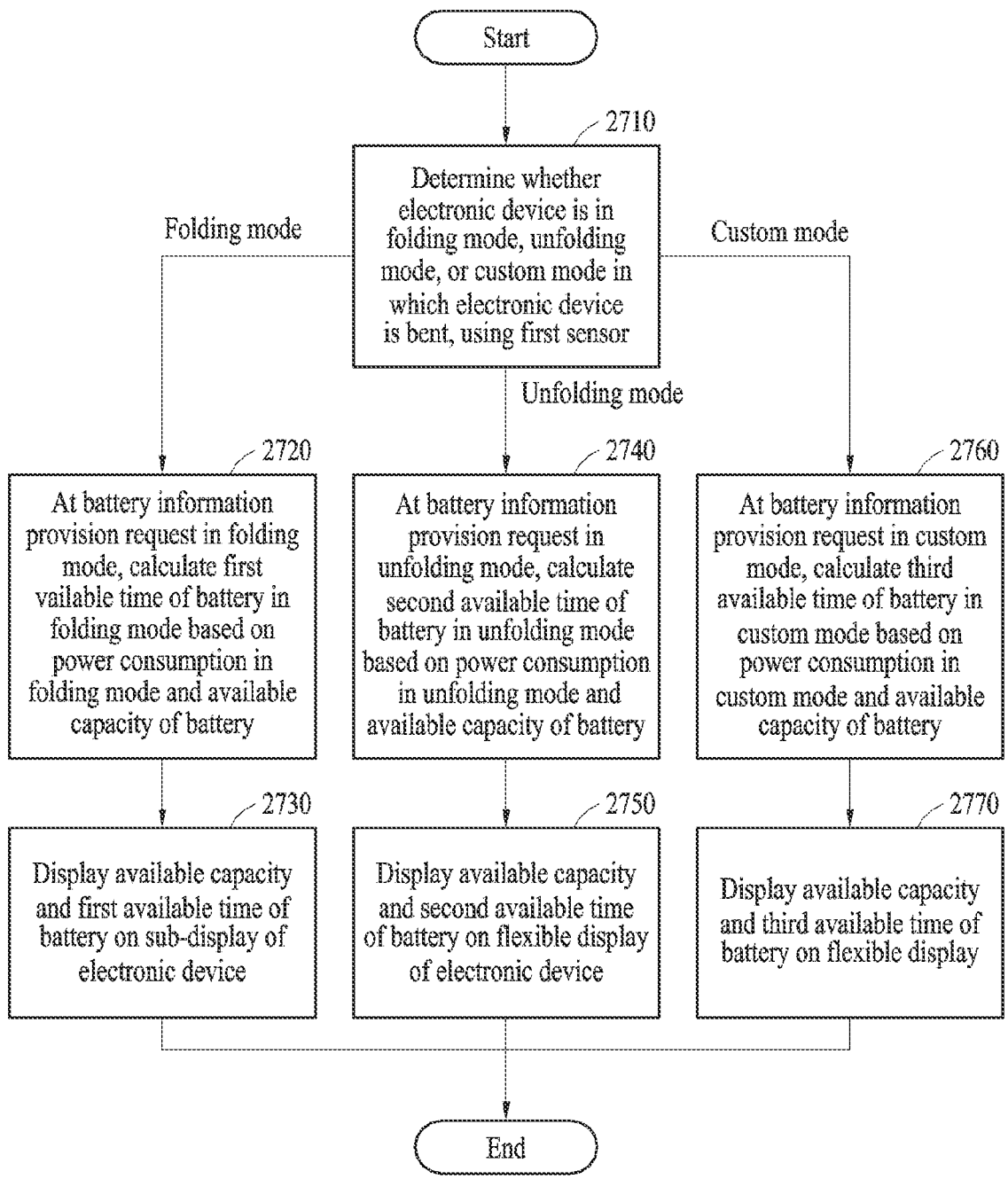
FIG. 27 is a flowchart illustrating an example method of operating an electronic device according to various embodiments.

FIG. 27 is a flowchart illustrating an example method of operating the electronic device 700 according to various embodiments.

In operation 2710, the electronic device 700 may determine whether the electronic device 700 is in a folding mode, an unfolding mode, or a custom mode in which the electronic device 700 is bent, using the first sensor 720.

In operation 2720, at a battery information provision request in the folding mode, the electronic device 700 may calculate a first available time of the battery 760 in the folding mode based on a power consumption in the folding mode and an available capacity of the battery 760.

In operation 2730, the electronic device 700 may display the available capacity and the first available time of the battery 760 on the sub-display 740 of the electronic device 700.

In operation 2740, at a battery information provision request in the unfolding mode, the electronic device 700 may calculate a second available time of the battery 760 in the unfolding mode based on a power consumption in the unfolding mode and the available capacity of the battery 760.

In operation 2750, the electronic device 700 may display the available capacity and the second available time of the battery 760 on the flexible display 750 of the electronic device 700.

In operation 2760, at a battery information provision request in the custom mode, the electronic device 700 may calculate a third available time of the battery 760 in the custom mode based on a power consumption in the custom mode and the available capacity of the battery 760.

In operation 2770, the electronic device 700 may display the available capacity and the third available time of the battery 760 on the flexible display 750.

The example embodiments described with reference to FIGS. 1 to 26B may apply to the operating method of the electronic device 700 of FIG. 27, and thus a detailed description thereof may not be provided.

According to various example embodiments, an electronic device may include: a battery, a first sensor configured to detect a folding angle of the electronic device, a flexible display, a sub-display, and a processor configured to determine whether the electronic device is in a folding mode or an unfolding mode based on a detection result from the first sensor, wherein the processor is configured to: based on a battery information provision request in the folding mode of the electronic device, calculate a first available time of the battery in the folding mode based on a power consumption in the folding mode and an available capacity of the battery and control the sub-display to display the available capacity and the first available time of the battery on the sub-display, and based on the battery information provision request in the unfolding mode of the electronic device, calculate a second available time of the battery in the unfolding mode based on a power consumption in the unfolding mode and the available capacity of the battery and control the flexible display to display the available capacity and the second available time of the battery on the flexible display.

According to various example embodiments, the processor may be configured to record a pattern regarding a form in which the flexible display is used, and generate a custom mode using the recorded pattern.

According to various example embodiments, the processor may be configured to determine that the electronic device is in the custom mode based on the detection result from the first sensor, and based on the battery information provision request in the custom mode of the electronic device, calculate a third available time of the battery in the custom mode based on a power consumption in the custom mode and the available capacity of the battery and control the flexible display to display the third available time of the battery on the flexible display.

According to various example embodiments, the processor may be configured to calculate the first available time and the second available time of the battery in the custom mode of the electronic device and control the flexible display to display the first available time and the second available time on the flexible display.

According to various example embodiments, the processor may be configured to, based on the battery information provision request in the folding mode of the electronic device, further calculate the second available time of the battery based on the power consumption in the unfolding mode and the available capacity of the battery, control the sub-display to display the available capacity and the first available time of the battery in a first area of the sub-display, and display the second available time of the battery in at least one of the first area or a second area of the sub-display.

According to various example embodiments, the processor may be configured to control the sub-display to display an object filled to correspond to the available capacity of the battery in the first area of the sub-display, display a first object in a shape corresponding to the folding mode in an area adjacent to a first point on the object 820, and display a second object in a shape corresponding to the unfolding mode in an area adjacent to a second point on the object.

According to various example embodiments, the first point may correspond to the first available time, and the second point may correspond to the second available time.

According to various example embodiments, the processor may be configured to control the sub-display to display a first object in a shape corresponding to the folding mode and a second object in a shape corresponding to the unfolding mode on the sub-display, display the available capacity of the battery in an area adjacent to the first object, and display information indicating that the available time of the battery decreases based on changing from the folding mode to the unfolding mode, in an area adjacent to the second object.

According to various example embodiments, the processor may be configured to, based on the battery information provision request in the unfolding mode of the electronic device, further calculate the first available time of the battery based on the power consumption in the folding mode and the available capacity of the battery, control the flexible display to display the available capacity and the second available time of the battery in a first area of the flexible display, and display the first available time in at least one of the first area or a second area of the flexible display.

According to various example embodiments, the processor may be configured to control the flexible display to display an object 920 filled to correspond to the available capacity of the battery in the first area of the flexible display, display a first object in a shape corresponding to the folding mode in an area adjacent to a first point on the object, and display a second object in a shape corresponding to the unfolding mode in an area adjacent to a second point on the object.

According to various example embodiments, the processor may be configured to control the flexible display to display a first object in a shape corresponding to the folding mode and a second object in a shape corresponding to the unfolding mode on the flexible display, display the available capacity of the battery in an area adjacent to the second object, and display information indicating that the available time of the battery increases based on changing from the unfolding mode to the folding mode, in an area adjacent to the first object.

According to various example embodiments, the processor may be configured to, based on the battery information provision request in the folding mode and a power saving mode of the electronic device, calculate an available time of the battery in the folding mode and the power saving mode and control the sub-display to display the available time on the sub-display (e.g., in a first area 1010 of FIG. 10), and at the battery information provision request in the unfolding mode and the power saving mode of the electronic device, calculate an available time of the battery in the unfolding mode and the power saving mode and control the flexible display to display the available time on the flexible display (e.g., in a first area 1110 of FIG. 11).

According to various example embodiments, the processor may be configured to control the sub-display to display a time needed for the battery to be fully charged in the folding mode based on charging the electronic device in the folding mode, on the sub-display, and display a time needed for the battery to be fully charged in the unfolding mode based on charging the electronic device in the unfolding mode, on the flexible display.

According to various example embodiments, the processor may be configured to, based on a user having a schedule, verify a time left before the schedule in the unfolding mode of the electronic device, determine whether the battery 60 is usable until the schedule based on the time left and the second available time of the battery, and in response to a determination that the battery is not usable until the schedule, provide information indicating that the battery is not usable until the schedule and request the user to switch from the unfolding mode to the folding mode.

According to various example embodiments, an electronic device may include: a battery, a flexible display, and a processor configured to: based on a battery information provision request in a first mode in which the flexible display is reduced, calculate a fourth available time of the battery in the first mode based on a power consumption in the first mode and an available capacity of the battery and control the flexible display to display the available capacity and the fourth available time of the battery on the flexible display, and based on the battery information provision request in a second mode in which the flexible display is expanded, calculate a fifth available time of the battery in the second mode based on a power consumption in the second mode and the available capacity of the battery and control the flexible display to display the available capacity and the fifth available time of the battery on the flexible display.

According to various example embodiments, the processor may be configured to record a pattern regarding a form in which the flexible display is used, and generate a custom mode using the recorded pattern.

According to various example embodiments, the processor may be configured to, based on the battery information provision request in the custom mode, calculate a sixth available time of the battery in the custom mode based on a power consumption in the custom mode and the available capacity of the battery and control the flexible display to display the sixth available time on the flexible display.

According to various example embodiments, the processor may be configured to further calculate the fourth available time and the fifth available time of the battery in the custom mode, and control the flexible display to display the fifth available time and the sixth available time on the flexible display.

According to various example embodiments, an electronic device may include: a battery, a display, a connector electrically connected to a detachable module, and a processor configured to: based on a battery information provision request in a detaching mode in which the module is detached from the electronic device, calculate a seventh available time of the battery in the detaching mode based on a power consumption in the detaching mode and an available capacity of the battery and control the display to display the available capacity and the seventh available time of the battery on the display, and based on the battery information provision request in an attaching mode in which the module is attached to the electronic device through the connector, calculate an eighth available time of the battery in the attaching mode based on a power consumption in the attaching mode and the available capacity of the battery and control the display to display the available capacity and the eighth available time of the battery on the display.

According to various example embodiments, the detachable module may include at least one of a display module, a camera module, a speaker module, or a keyboard module.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a battery;
   a first sensor configured to detect a folding angle of the electronic device;
   a flexible display;
   a sub-display; and
   a processor configured to determine whether the electronic device is in a folding mode or an unfolding mode based on a detection result from the first sensor, wherein the processor is configured to: based on a battery information provision request in the folding mode of the electronic device, calculate a first available time of the battery in the folding mode based on a power consumption in the folding mode and an available capacity of the battery and control the sub-display to display the available capacity and the first available time on the sub-display, and based on the battery information provision request in the unfolding mode of the electronic device, calculate a second available time of the battery in the unfolding mode based on a power consumption in the unfolding mode and the available capacity and control the flexible display to display the available capacity and the second available time on the flexible display.

2. The electronic device of claim 1, wherein the processor is configured to record a pattern regarding a form in which the flexible display is used, and generate a custom mode using the recorded pattern.

3. The electronic device of claim 2, wherein the processor is configured to: determine that the electronic device is in the custom mode based on the detection result from the first sensor, and based on the battery information provision request in the custom mode of the electronic device, calculate a third available time of the battery in the custom mode based on a power consumption in the custom mode and the available capacity of the battery and control the flexible display to display the third available time on the flexible display.

4. The electronic device of claim 3, wherein the processor is configured to: calculate the first available time and the second available time in the custom mode of the electronic device, and control the flexible display to display the first available time and the second available time on the flexible display.

5. The electronic device of claim 1, wherein the processor is configured to: based on the battery information provision request in the folding mode of the electronic device, further calculate the second available time based on the power consumption in the unfolding mode and the available capacity, control the sub-display to display the available capacity and the first available time in a first area of the sub-display, and control the sub-display to display the second available time in at least one of the first area or a second area of the sub-display.

6. The electronic device of claim 5, wherein the processor is configured to: control the sub-display to display an object filled to correspond to the available capacity in the first area of the sub-display, display a first object in a shape corresponding to the folding mode in an area adjacent to a first point on the object, and display a second object in a shape corresponding to the unfolding mode in an area adjacent to a second point on the object,
wherein the first point corresponds to the first available time, and the second point corresponds to the second available time.

7. The electronic device of claim 5, wherein the processor is configured to: control the sub-display to display a first object in a shape corresponding to the folding mode and a second object in a shape corresponding to the unfolding mode on the sub-display, display the available capacity in an area adjacent to the first object, and display information indicating that the available time of the battery decreases based on changing from the folding mode to the unfolding mode, in an area adjacent to the second object.

8. The electronic device of claim 1, wherein the processor is configured to: based on the battery information provision request in the unfolding mode of the electronic device, further calculate the first available time based on the power consumption in the folding mode and the available capacity, control the flexible display to display the available capacity and the second available time in a first area of the flexible display, and display the first available time in at least one of the first area or a second area of the flexible display.

9. The electronic device of claim 8, wherein the processor is configured to: control the flexible display to display an object filled to correspond to the available capacity in the first area of the flexible display, display a first object in a shape corresponding to the folding mode in an area adjacent to a first point on the object, and display a second object in a shape corresponding to the unfolding mode in an area adjacent to a second point on the object,
wherein the first point corresponds to the first available time, and the second point corresponds to the second available time.

10. The electronic device of claim 8, wherein the processor is configured to: control the flexible display to display a first object in a shape corresponding to the folding mode and a second object in a shape corresponding to the unfolding mode on the flexible display, display the available capacity in an area adjacent to the second object, and display information indicating that the available time of the battery increases based on changing from the unfolding mode to the folding mode, in an area adjacent to the first object.

11. The electronic device of claim 1, wherein the processor is configured to: based on the battery information provision request in the folding mode and a power saving mode of the electronic device, calculate an available time of the battery in the folding mode and the power saving mode and control the sub-display to display the available time on the sub-display, and based on the battery information provision request in the unfolding mode and the power saving mode of the electronic device, calculate an available time of the battery in the unfolding mode and the power saving mode and control the flexible display to display the available time on the flexible display.

12. The electronic device of claim 1, wherein the processor is configured to: control the sub-display to display a time needed for the battery to be fully charged in the folding mode based on charging the electronic device in the folding mode, on the sub-display, and control the flexible display to display a time needed for the battery to be fully charged in the unfolding mode based on charging the electronic device in the unfolding mode, on the flexible display.

13. The electronic device of claim 1, wherein the processor is configured to: based on a schedule, verify a time left before the schedule in the unfolding mode of the electronic device, determine whether the battery is usable until the schedule based on the time left and the second available time, and in response to a determination that the battery is not usable until the schedule, provide information indicating that the battery is not usable until the schedule and request the user to switch from the unfolding mode to the folding mode.

14. An electronic device, comprising:
a battery;
a flexible display; and
a processor configured to: based on a battery information provision request in a first mode in which the flexible display is reduced, calculate a fourth available time of the battery in the first mode based on a power consumption in the first mode and an available capacity of the battery and control the flexible display to display the available capacity and the fourth available time on the flexible display, and based on the battery information provision request in a second mode in which the flexible display is expanded, calculate a fifth available time of the battery in the second mode based on a power consumption in the second mode and the available capacity and control the flexible display to display the available capacity and the fifth available time on the flexible display.

15. The electronic device of claim 14, wherein the processor is configured to: record a pattern regarding a form in which the flexible display is used, and generate a custom mode using the recorded pattern.

16. The electronic device of claim 15, wherein the processor is configured to: based on the battery information provision request in the custom mode, calculate a sixth available time of the battery in the custom mode based on a power consumption in the custom mode and the available capacity of the battery and control the flexible display to display the sixth available time on the flexible display.

17. The electronic device of claim 16, wherein the processor is configured to: further calculate the fourth available time and the fifth available time in the custom mode, and control the flexible display to display the fifth available time and the sixth available time on the flexible display.

18. An electronic device, comprising:
 a battery;
 a display;
 a connector electrically connected to a detachable module; and
 a processor configured to: based on a battery information provision request in a detaching mode in which the detachable module is detached from the electronic device, calculate a seventh available time of the battery in the detaching mode based on a power consumption in the detaching mode and an available capacity of the battery and control the display to display the available capacity and the seventh available time on the display, and based on the battery information provision request in an attaching mode in which the detachable module is attached to the electronic device through the connector, calculate an eighth available time of the battery in the attaching mode based on a power consumption in the attaching mode and the available capacity and control the display to display the available capacity and the eighth available time on the display.

19. The electronic device of claim 18, wherein the detachable module comprises at least one of a display module, a camera module, a speaker module, or a keyboard module.

20. A method of operating an electronic device, the method comprising:
 determining whether the electronic device is in a folding mode, an unfolding mode, or a custom mode in which the electronic device is bent, using a first sensor;
 based on a battery information provision request in the folding mode, calculating a first available time of the battery in the folding mode based on a power consumption in the folding mode and an available capacity of the battery;
 displaying the available capacity and the first available time on a sub-display of the electronic device;
 based on the battery information provision request in the unfolding mode, calculating a second available time of the battery in the unfolding mode based on a power consumption in the unfolding mode and the available capacity;
 displaying the available capacity and the second available time on a flexible display of the electronic device;
 based on the battery information provision request in the custom mode, calculating a third available time of the battery in the custom mode based on a power consumption in the custom mode and the available capacity; and
 displaying the available capacity and the third available time on the flexible display.

\* \* \* \* \*